(12) United States Patent
Park et al.

(10) Patent No.: US 10,423,306 B2
(45) Date of Patent: Sep. 24, 2019

(54) MOBILE TERMINAL AND CONTROL METHOD THEREOF

(71) Applicant: LG ELECTRONICS INC., Seoul (KR)

(72) Inventors: Junho Park, Seoul (KR); Bokheun Lee, Seoul (KR); Jiseok Jung, Seoul (KR); Seungjun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 192 days.

(21) Appl. No.: 15/529,391

(22) PCT Filed: Feb. 27, 2015

(86) PCT No.: PCT/KR2015/001949
§ 371 (c)(1),
(2) Date: May 24, 2017

(87) PCT Pub. No.: WO2016/114444
PCT Pub. Date: Jul. 21, 2016

(65) Prior Publication Data
US 2017/0269800 A1 Sep. 21, 2017

(30) Foreign Application Priority Data
Jan. 13, 2015 (KR) .................. 10-2015-0006384

(51) Int. Cl.
*G06F 3/0482* (2013.01)
*G06F 3/0486* (2013.01)
(Continued)

(52) U.S. Cl.
CPC .......... *G06F 3/0482* (2013.01); *G06F 3/0486* (2013.01); *G06F 3/0488* (2013.01);
(Continued)

(58) Field of Classification Search
CPC ..................................................... G06F 3/0482
(Continued)

(56) References Cited

U.S. PATENT DOCUMENTS 10,095,380 B2 * 10/2018 Moon ................. G06F 3/04817
2011/0105190 A1 * 5/2011 Cha ........................ G06F 17/276
455/566

(Continued)

FOREIGN PATENT DOCUMENTS

KR 10-2011-0049541 A 5/2011
KR 10-2013-0005174 A 1/2013
(Continued)

*Primary Examiner* — William D Titcomb
(74) *Attorney, Agent, or Firm* — Birch, Stewart, Kolasch & Birch, LLP

(57) ABSTRACT

The present specification discloses a mobile terminal and a control method thereof. According to an embodiment of the present specification, the mobile terminal comprises: a display unit configured to output a first region which displays messages and a second region which displays information on a contact corresponding to the messages; and a control unit for outputting, to the display unit, a controller user interface (UI) for processing the messages to be displayed in the first region in association with the information on the contact displayed in the second region when a preset touch input is received in the second region. Here, the controller UI comprises: a menu region which displays scrap information associated with the information on the contact displayed in the second region among the messages displayed in the first region; and an input region which displays a message corresponding to the scrap information selected in the menu region.

20 Claims, 38 Drawing Sheets

(51) Int. Cl.
*G06F 3/0488* (2013.01)
*H04L 12/58* (2006.01)
*H04L 29/06* (2006.01)
*H04W 4/14* (2009.01)
*G06F 3/0485* (2013.01)
*H04M 1/725* (2006.01)
*G06F 3/0481* (2013.01)

(52) U.S. Cl.
CPC ...... *G06F 3/04855* (2013.01); *G06F 3/04883* (2013.01); *H04L 51/04* (2013.01); *H04L 51/22* (2013.01); *H04L 65/403* (2013.01); *H04M 1/72552* (2013.01); *H04W 4/14* (2013.01); *G06F 3/04817* (2013.01); *G06F 2203/04806* (2013.01); *G06F 2203/04807* (2013.01); *G06F 2203/04808* (2013.01)

(58) Field of Classification Search
USPC .......................................... 715/753
See application file for complete search history.

(56) References Cited

U.S. PATENT DOCUMENTS

| | | | |
|---|---|---|---|
| 2011/0314375 A1* | 12/2011 | Zaika | G06F 3/0482 715/708 |
| 2013/0012271 A1* | 1/2013 | Chi | H04M 1/72547 455/566 |
| 2013/0086180 A1* | 4/2013 | Midgen | G06Q 10/107 709/206 |
| 2014/0047358 A1* | 2/2014 | Park | H04M 1/72552 715/758 |
| 2014/0059448 A1* | 2/2014 | Lee | H04L 51/00 715/752 |
| 2015/0067609 A1* | 3/2015 | Moon | G06F 3/04817 715/835 |
| 2016/0062557 A1* | 3/2016 | Kim | G06F 3/0481 715/748 |
| 2017/0061393 A1* | 3/2017 | Park, II | G06Q 10/1093 |

FOREIGN PATENT DOCUMENTS

| | | |
|---|---|---|
| KR | 10-2014-0020112 A | 2/2014 |
| KR | 10-2014-0027843 A | 3/2014 |
| KR | 10-2014-0066745 A | 6/2014 |

* cited by examiner

MOBILE TERMINAL AND CONTROL METHOD THEREOF

CROSS REFERENCE TO RELATED APPLICATIONS

This application is the National Phase of PCT International Application No. PCT/KR2015/001949, filed on Feb. 27, 2015, which claims priority under 35 U.S.C. 119(a) to Patent Application No. 10-2015-0006384, filed in Republic of Korea on Jan. 13, 2015, all of which are hereby expressly incorporated by reference into the present application.

TECHNICAL FIELD

The present invention relates to a mobile terminal capable of displaying and storing messages which have been transmitted and received, and a method for controlling the same.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can be allowed to capture still images or moving images, play music or video files, play games, receive broadcast and the like, so as to be implemented as an integrated multimedia player.

Various attempts have been made to implement complicated functions in such a multimedia device by means of hardware or software.

In case of searching a message associated with a specific person among messages transceived with a specific person or a plurality of persons by using such a mobile terminal, a user should memorize a related keyword, or should scroll a screen for a long time. If it takes a lot of time to search for a specific message, chats may be interrupted or a subject may be changed, resulting in a meaningless search result. Such inconvenience is increased when chats through messages are performed with a plurality of persons.

DISCLOSURE OF THE INVENTION

Therefore, an object of the present invention is to provide a mobile terminal capable of more easily storing, checking and using a message associated with a specific person, among messages transceived with a specific person or a plurality of persons, and a method for controlling the same.

Another object of the present invention is to provide a mobile terminal capable of differently processing a message transceived with a specific person during a group chatting, and a method for controlling the same. Another object of the present invention is to provide a mobile terminal capable of providing indexing information such that a specific message or information is more easily searched from a plurality of messages transceived with chat partners, and a method for controlling the same.

To achieve these and other advantages and in accordance with the purpose of the present invention, as embodied and broadly described herein, there is provided a mobile terminal, comprising: a display unit configured to output a first region which displays messages and a second region which displays chat partner information corresponding to the messages; and a controller for outputting, to the display unit, a controller user interface (UI) for processing a message to be displayed on the first region in association with a chat partner corresponding to the second region when a preset touch input is received on the second region, wherein the controller UI comprises: a menu region which displays scrap information associated with the chat partner corresponding to the second region among the messages displayed on the first region; and an input region which displays a message corresponding to the scrap information selected from the menu region. With such a configuration, a user may immediately check, send and share a message stored in association with a specific person, by using a controller UI.

In an embodiment, the preset touch input is a touch input to rub the second region right and left or up and down, and the controller UI is popped-up when the touch input is released.

In an embodiment, on the controller UI, the input region is formed as an inner circle, and the menu region is formed as an outer circle which encloses an edge of the input region and which is rotatable in at least one direction.

In an embodiment, if a touch input to rotate the menu region in one direction is applied to the menu region, the menu region is rotated along the touch input in a fixed state of the input region, and the scrap information is changed in correspondence to the rotation.

In an embodiment, the first and second regions are converted into a deactivated state while the controller UI is being output, and if a touch input is applied to a region outside the controller UI, the controller UI disappears and the first and second regions are converted into an activated state.

In an embodiment, if the scrap information selected from the menu region is dragged to the input region, the controller displays a message corresponding to the selected scrap information on the input region.

In an embodiment, if a first touch input is applied to the input region in a displayed state of at least one message on the input region, the controller controls the at least one message to be output to a display region of a message to be sent.

In an embodiment, if a second touch input is applied to the input region in a displayed state of at least one message on the input region, the controller UI disappears, and a chat screen corresponding to an output position of the at least one message is output to the display unit.

In an embodiment, if a sharing function item displayed on the menu region is selected in a displayed state of at least one message on the input region, the scrap information displayed on the menu region is converted into information on a chat partner to which the at least one message is to be sent.

In an embodiment, if the controller UI is output, the chat partner information displayed on the second region is displayed on the input region. And if a touch input is applied to the input region before the scrap information is selected, the controller converts the scrap information displayed on the menu region into another item related to the chat partner information displayed on the input region.

In an embodiment, if a chat partner viewing item is selected from the menu region, the controller converts the scrap information displayed on the menu region into icons corresponding to the chat partner information.

In an embodiment, if a touch line of a first shape (v) is drawn on one of the icons and a drag input toward the input region is received, the controller controls only messages sent from a chat partner corresponding to the one icon, to be output the display unit.

In an embodiment, if a touch line of a second shape (S) is drawn on one of the icons and a drag input toward the input region is received, the controller controls a written message to be sent to only a chat partner corresponding to the one icon.

In an embodiment, if a drag input toward the input region is applied to one of the icons and a touch input is applied to the input region, the controller controls a blind chatting to be performed with a chat partner corresponding to the one icon, on a current chat screen.

In an embodiment, if messages corresponding to the blind chatting are displayed on blind regions visually differentiated from other messages, and the other messages are displayed among the plurality of blind regions.

In an embodiment, if a drag input is applied from one of the first and second regions toward another thereof, the controller stores scrap information generated by correlating a message displayed on the first region with chat partner information displayed on the second region.

In an embodiment, the scrap information is generated based on at least one keyword extracted from the message displayed on the first region. And if a preset touch input is received on the second region, the controller controls the generated scrap information to be displayed on the menu region.

In an embodiment, a mark visually differentiated from another message is output to a message corresponding to the scrap information. And if a touch line of a preset shape is input to the scrap information displayed on the menu region, the mark on the message corresponding to the scrap information is released.

In an embodiment, when the preset touch input is received on the second region, the controller displays first screen information for setting a password to a message displayed on the second region. And when a password is input by using the first screen information, the controller converts the message displayed on the second region into a substitution image.

To achieve these and other advantages and in accordance with the purpose of the present invention, as embodied and broadly described herein, there is also provided a method for controlling a mobile terminal including a display unit, the method comprising: displaying messages on a first region of the display unit, and displaying chat partner information corresponding to the messages on a second region of the display unit; and if a preset touch input is received on the second region, outputting a controller user interface (UI) for processing a message to be displayed on the first region in association with the chat partner information displayed on the second region; selecting scrap information associated with the chat partner information displayed on the second region, by using the controller UI; and displaying a message corresponding to the selected scrap information on the controller UI.

Effects of the Present Invention

As aforementioned, in the mobile terminal and the control method thereof according to an embodiment of the present invention, among messages transceived with a specific person or a plurality of persons, messages desired to be associated with a specific person may be immediately stored or checked to be used, based on a touch input. With such a configuration, a user may immediately store a desired message or information in association with a specific person while chatting, or may check the stored message while chatting or may immediately write a message using the stored message. This may enhance a user convenience.

Further, a user may perform a blind chatting with a specific person by using a controller UI during a group chatting, or may check only messages sent from a specific person. Also, it is possible to change a content of a displayed message by using a touch input.

Further, indexing information is provided to a scroll bar region such that a specific message or information among a plurality of messages transceived with a chat partner is easily searched. This may allow a user to more easily search for desired information on a chat screen.

MODES FOR CARRYING OUT THE PREFERRED EMBODIMENTS

Figure 1:
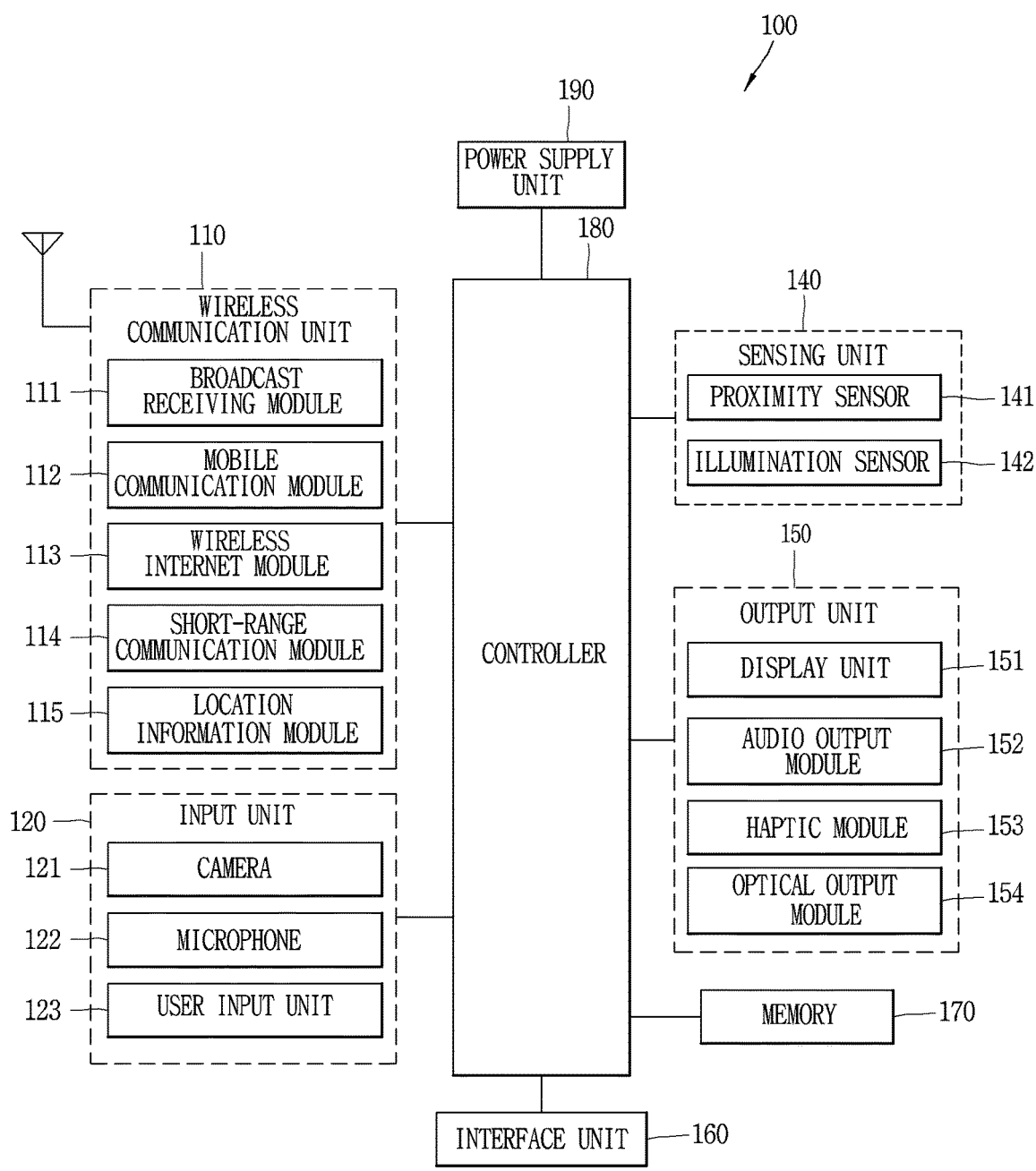
FIG. 1 is a block diagram showing an example of a mobile terminal according to an embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 2A:
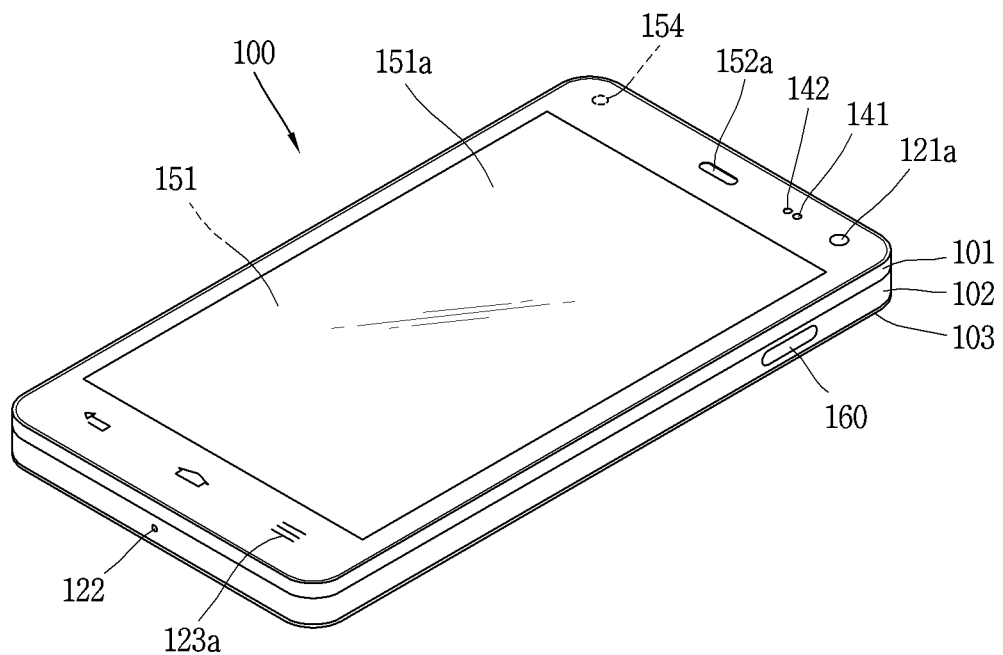
FIGS. 2A and 2B are views illustrating a mobile terminal according to an embodiment of the present invention, which are viewed from different directions.
Figure 2B:
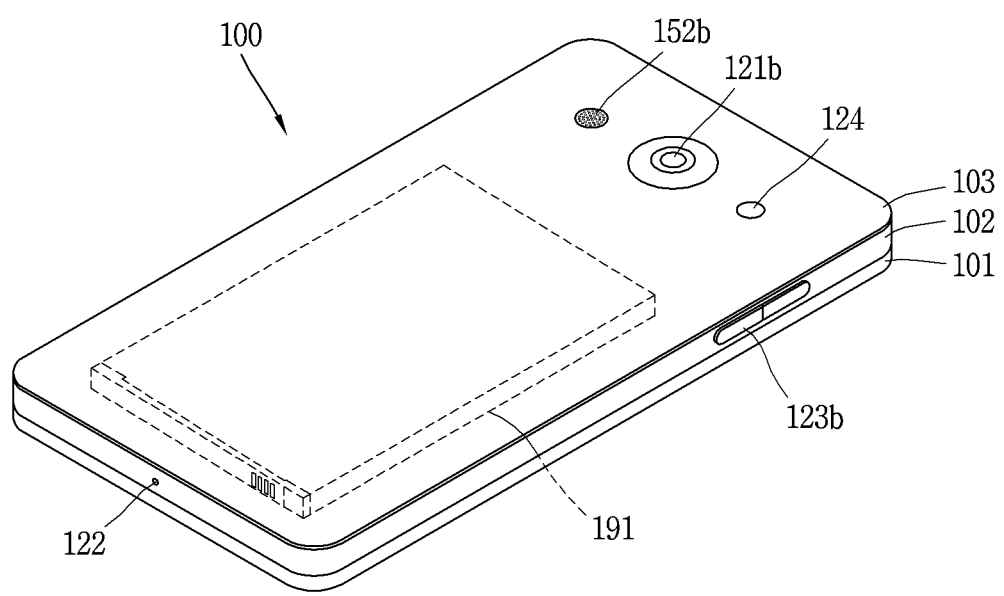

Referring to FIGS. 1 and 2B, FIG. 1 is a block diagram showing an example of a mobile terminal according to an embodiment of the present invention. And FIGS. 2A and 2B are views illustrating a mobile terminal according to an embodiment of the present invention, which are viewed from different directions;

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1 is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components, or activating application programs stored in the memory 170.

The controller 180 may control at least part of the components illustrated in FIG. 1 in order to drive application programs stored in the memory 170. Further, in order to drive the application programs, the controller 180 may operate at least two of the components included in the mobile terminal 100 in a cooperating manner.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of the mobile terminal according to various embodiments to be explained later. The operation or the control method of the mobile terminal may be implemented on a mobile terminal by driving at least one application program stored in the memory 170.

Referring still to FIG. 1, various components depicted in this figure will now be described in more detail, before explaining various embodiments of the mobile terminal 100.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and causes output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 2A and 2B, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The terminal body may be understood as at least one integrated assembly of the mobile terminal 100.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first and second audio output modules 152a, 152b, the proximity sensor 141, the illumination sensor 142, the optical output module 154, the first and second cameras 121a, 121b, the first and second manipulation units 123a, 123b, the microphone 122, the interface unit 160, etc.

Hereinafter, as shown in FIGS. 2A and 2B, the mobile terminal 100 will be explained in an assumption that the display unit 151, the first audio output module 152a, the proximity sensor 141, the illumination sensor 142, the optical output module 154, the first camera 121a, and the first manipulation unit 123a are disposed on a front surface of the terminal body, the microphone 122 and the interface unit 160 are disposed on a side surface of the terminal body, and the second audio output module 152b and the second camera 121b are disposed on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

In the drawings, the first manipulation unit 123a is illustrated as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1) may be retractable into the terminal body. Alternatively, an antenna may be formed using a film attached to an inner surface of the rear cover 103, or a case that includes a conductive material.

The power supply unit 190 (refer to FIG. 1) for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal 100 according to an embodiment of the present specification, which includes at least one of the aforementioned components, may transceive messages with another party's terminal. And when a preset touch input is received at a chat partner information display region on a chat screen (a message chat screen), the mobile terminal 100 may output, to the display unit 151, a controller user interface (UI) for processing a message to be displayed in association with chat partner information which has been touched.

Here, the controller UI includes a menu region which displays scrap information associated with chat partner information which has been touched among messages output to the chat screen, and an input region which displays a message corresponding to the scrap information selected from the menu region.

The controller UI may be output in an overlapped manner with at least part of a current chat screen, or may be output to an additional region distinguished from the current chat screen. A user may store a specific message in association with a specific person by using the output controller UI, with checking transceived (transmitted and received) messages displayed on the current chat screen. And the user may easily check and use messages related to a specific person.

The message transceived through the mobile terminal 100 is real-time text communication using a network such as the Internet, among two or more chat partners, which is also called a messenger. Such a message is immediately output to a screen of another party's terminal as soon as it is sent, which enables real-time communication like a telephone. The chat screen includes a region which displays messages transceived between chat partners, and a region which displays chat partner information.

The preset touch input applied to the region which displays chat partner information means a preset type of touch gesture applied to a region which displays a text, an image, an icon, or the like which represents a chat partner with whom messages have been transceived. For instance, the preset touch input may be a long-press touch input or a touch/drag input which draws a specific pattern. If a touch input different from the preset touch input (e.g., a short-press touch input) is applied to the region which displays chat partner information on the chat screen, may be output a screen corresponding to a function different from the function aforementioned in the present specification (e.g., viewing another party's profile information).

FIGS. 3A to 3D are conceptual views illustrating a method for controlling the mobile terminal according to an embodiment of the present invention.

Figure 3A:
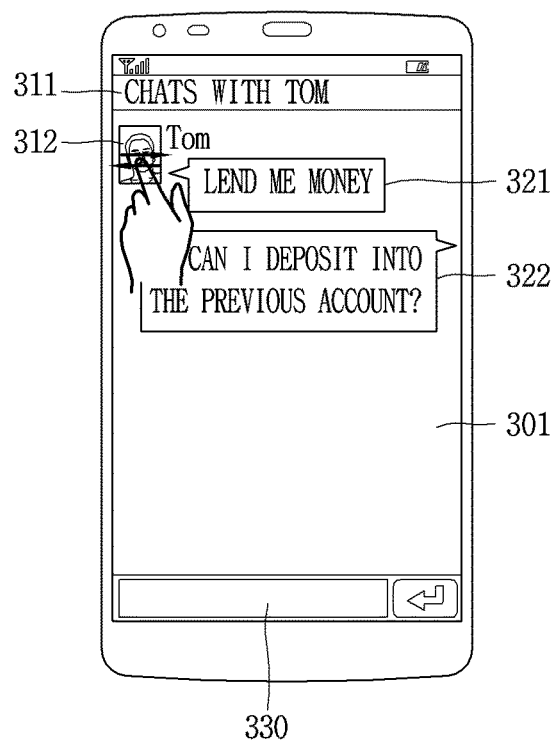
FIGS. 3A to 3D are conceptual views illustrating a method for controlling a mobile terminal according to an embodiment of the present invention.

Referring to FIG. 3A, in the mobile terminal 100 according to an embodiment of the present invention, a chat screen 301 corresponding to an execution of a message application may be output to the display unit 151. The chat screen 301 includes regions 311, 312 which display information on a chat partner, and regions 321, 322 which display messages transceived with the chat partner. FIG. 3A shows that the first regions are displayed on an upper end region of the display unit 151 (311), and on a left region of the display unit 151 (312). However, the present invention is not limited to this. The information on a chat partner may be an icon corresponding to an image set in a user's terminal or another party's terminal, and/or a name or a phone number stored in an address book.

Figure 3B:
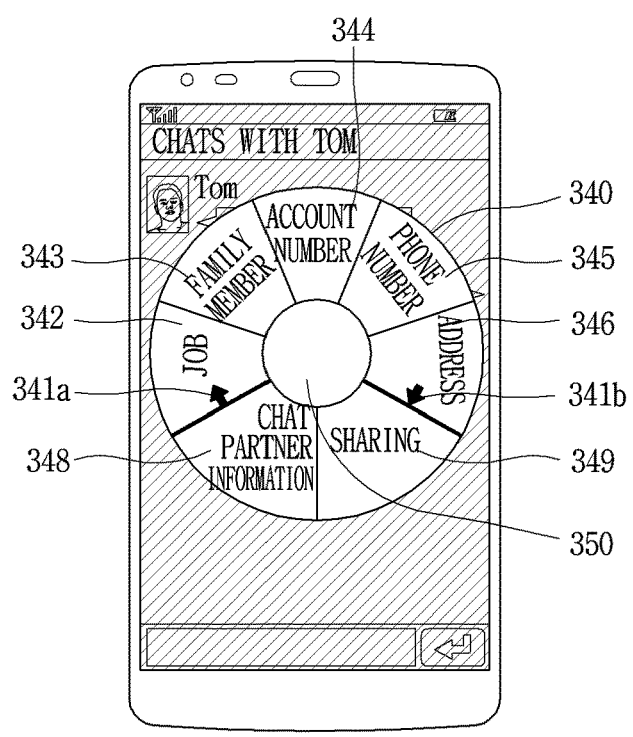

If a user applies a preset touch input (e.g., a long touch input) to the region 311 or 312 which displays information on a chat partner, or if a user applies a touch input having a pattern to rub the corresponding region 311 or 312 right and left or up and down a predetermined number of times, a controller user interface (UI) is popped-up on the chat screen 301 as shown in FIG. 3B. Here, the chat screen 301 may be processed to have a predetermined transparency, and transceived messages may be real time displayed on the message hat screen 301 even while the controller UI is being popped-up.

As shown in FIG. 3B, the controller UI may be formed to have a double circular structure of an inner circle region 350 and an outer circle region 340.

The inner circle region 350 may be formed as an empty space, or may be an input region which displays chat partner information corresponding to the region 311 or 312 where a preset touch input has been received, e.g., an input region which displays text information or an image icon. And the outer circle region 340 may be a menu region which displays scrap information related to a chat partner corresponding to the region 311 or 312 where a preset touch input has been received. Here, the scrap information may be at least one of a keyword, a category, and an image which represents or implies a stored message. The scrap information may be automatically generated when a control command for storing a message is received, or may be generated or changed through a user input.

For instance, as shown in FIG. 3B, the scrap information may be implemented in plurality, in correspondence to messages stored in relation to a chat partner 'Tom'. For instance, the scrap information may include a 'job' 342, a 'family member' 343, an 'account number' 344, a 'phone number' 345, and an 'address' 346. And the scrap information may be rotatable in at least one direction, and may include image objects 341a, 341b indicating a rotation direction, on a menu region 340. For instance, if a flicking touch input is applied to the menu region 340 in a direction corresponding to the image objects 341a, 341b, the menu region of the controller UI is rotated like a roulette. And the 'address' 346, scrap information adjacent to the image object 341a, may disappear from the menu region, and next scrap information may be output near the image object 341a. Further, other menu items (e.g., 'chat partner information' 348 and 'sharing' 349) may be further displayed between the image objects 341a, 341b. An execution result by selection for the menu item will be explained in more detail.

When scrap information is selected from the menu region, the controller 180 of the mobile terminal 100 may display, on the input region, a message corresponding to the selected scrap information.

Figure 3C:
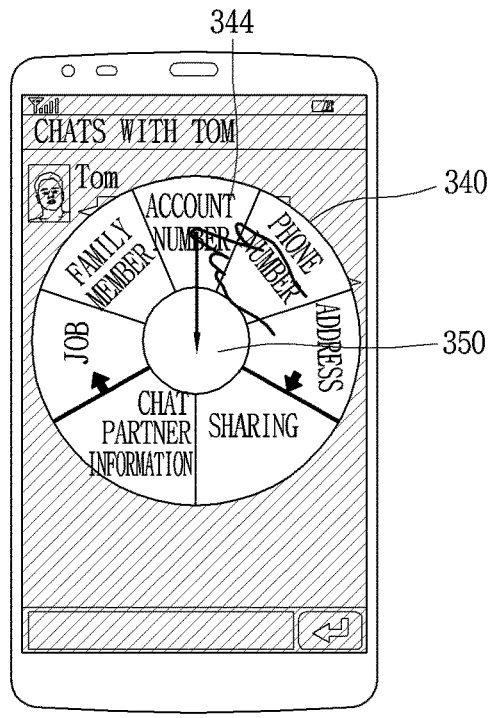
Figure 3D:
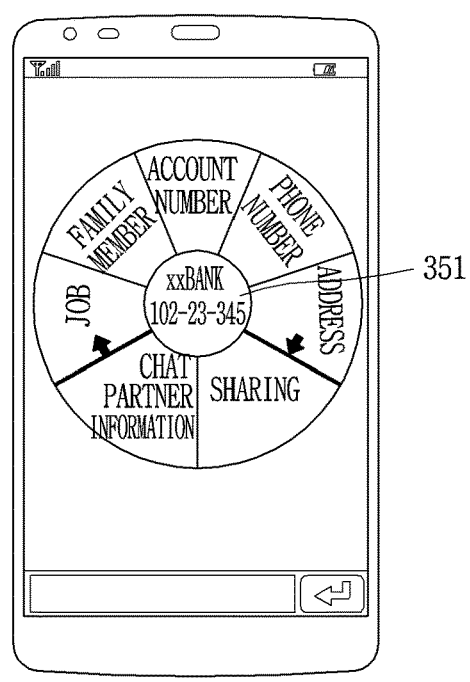

For instance, as shown in FIG. 3C, if a touch input applied to specific scrap information (e.g., the 'account number' 344) is dragged to the input region 350, the controller 180 of the mobile terminal 100 displays a message content corresponding to the selected scrap information 344, within the input region 350. As a result, as shown in FIG. 3D, a message 351, 'Your bank 102-23-345' is displayed on the input region.

In this state, in case of merely checking the message 351 related to a chat partner 'Tom', a user may continue chats by touching a region out of the controller UI. In another example, in case of transmitting the displayed message 351 to a chat partner, e.g., if a short-press touch input is applied to the input region 350, the message 351 displayed on the input region 350 may be automatically input to a message writing region on the chat screen. In another example, in case of returning the displayed message 351 to the previous output region, e.g., if a long-press touch input is applied to the input region 350, a chat screen corresponding to an output position of the message 351 displayed on the input region 350 may be output to the display unit 151.

Figure 4:
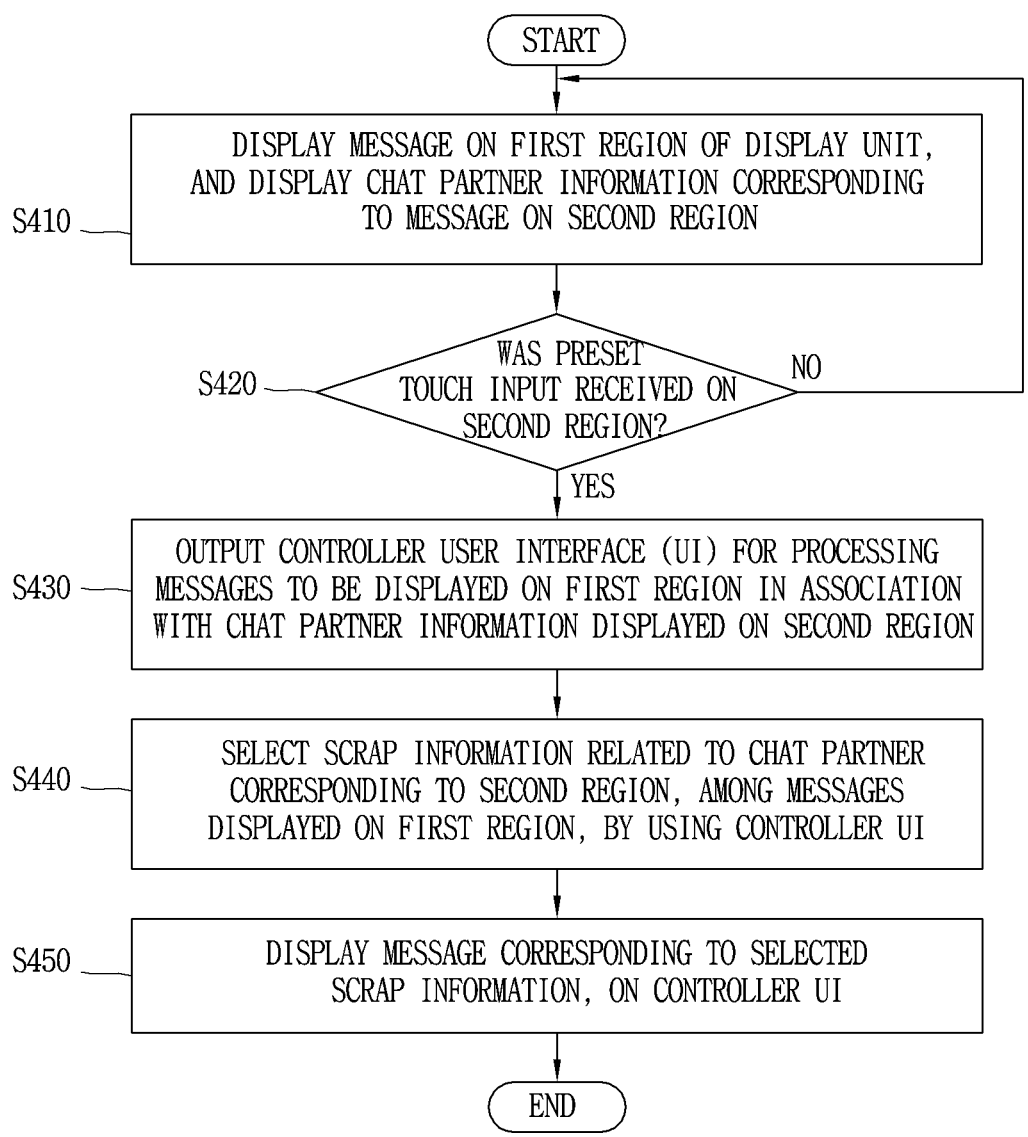
FIG. 4 is a flowchart for illustrating a method for controlling a mobile terminal according to an embodiment of the present invention.

FIG. 4 is a flowchart for illustrating a method for controlling the mobile terminal 100 according to an embodiment of the present invention.

As shown in FIG. 4, in the mobile terminal 100, a chat screen corresponding to an execution of a message application is output to the display unit 151. Here, messages transceived with a chat partner (i.e., transmitted and received messages) are displayed on a first region of the chat screen, and information on a chat partner corresponding to the transceived messages is displayed on a second region of the chat screen (S410).

If there is one chat partner, information on the chat partner may be displayed only on an upper end of the display unit 151. And a message received from the chat partner may be displayed on the same line as the chat partner information, or on a region adjacent to the chat partner information. For instance, as shown in FIG. 3A, a received message 321 may be displayed next to an image icon 312 related to a chat partner, 'Lee Hyo-Seong', in the form of a speech balloon.

Then, if a preset touch input is received on the second region which displays chat partner information (S420), the controller 180 of the mobile terminal 100 may output a controller UI for processing a message to be displayed on the first region, by correlating with a chat partner corresponding to the second region where the touch input has been received (S430).

Here, the preset touch input applied to the second region may be a touch/drag input to rub an image icon indicating a chat partner or a text region, up and down or right and left, a predetermined number of times, or may be a long-press touch input applied to the corresponding region. As aforementioned, if another type of touch input is applied to the corresponding region, another function related to chat partner information may be executed.

The processing a message to be displayed on the first region by correlating with a specific person means limiting a display type of a message to be transmitted or a transceived message, or a range of a previously-displayed message, into a message or information stored in association with a specific person. For instance, if chat partners on the chat screen are 'A, B, C', a search range is limited to a message or information stored in association with 'A'.

Further, the message or information stored in association with a specific person may be displayed on the controller UI, in the form of scrap information converted into a representative keyword or category, not in the form of the message or information itself. For instance, the menu region 340 shown in FIG. 3B may display scrap information such as a 'job' 342, a 'family member' 343, an 'account number' 344, a 'phone number' 345, and an 'address' 346. And the plurality of scrap information may be aligned according to a preset priority, e.g., a storage time order of a corresponding message, a frequent use order, etc. If a trigger signal for rotation in one direction is received through a touch input to the menu region 340, the input region 350 is rotated in a direction corresponding to the touch input, in a fixed state. And at least part of the scrap information is changed by such a rotation.

While the controller UI is being output to the display unit 151, the chat screen may be converted into a deactivated state. In this case, the controller UI may be output to the chat screen in a layered manner, and the chat screen may have a predetermined transparency. On the other hand, in another embodiment, even while the controller UI is being output to the display unit 151, transceived messages may be output to the chat screen in real time. In this case, for control of the controller UI, an input of control commands to the first region and the second region on the chat screen may be restricted.

Then, the controller 180 may select scrap information related to a chat partner corresponding to the second region where a touch input has been received, among messages displayed on the first region, by using the output controller UI (S440).

The selection of the scrap information may be performed by dragging a touch input applied to specific scrap information to the input region. If there is no desired scrap information, as aforementioned, a user may rotate the menu region like a roulette, by applying a flicking input or a drag input to the menu region of the controller UI in one direction.

If desired scrap information is selected, the controller 180 displays, on the input region of the controller UI, full messages or information corresponding to the selected scrap information (S450). For instance, as shown in FIGS. 3C and 3D, as the 'account number' displayed on the menu region 340 is dragged to the input region 350, a corresponding message, 'Your bank 102-23-345' is displayed on the input region 350. A user may merely check the message displayed on the input region, or may transmit or share the message.

As aforementioned, in an embodiment of the present invention, a user may immediately check a message stored in association with a specific person while chatting, or may immediately write a message using the stored message. This may enhance a user convenience.

Figure 5A:
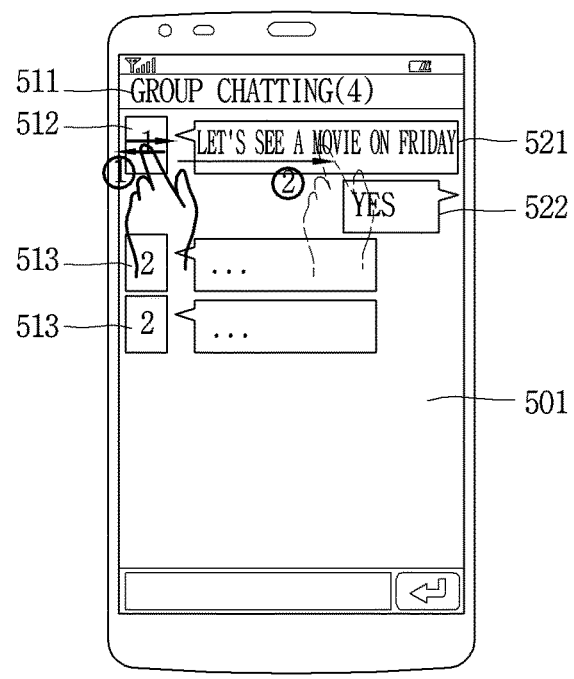
FIGS. 5A and 5B are views illustrating a method of storing a specific message among chat messages transceived with chat partners, in association with a specific person, in a mobile terminal according to an embodiment of the present invention.
Figure 5B:
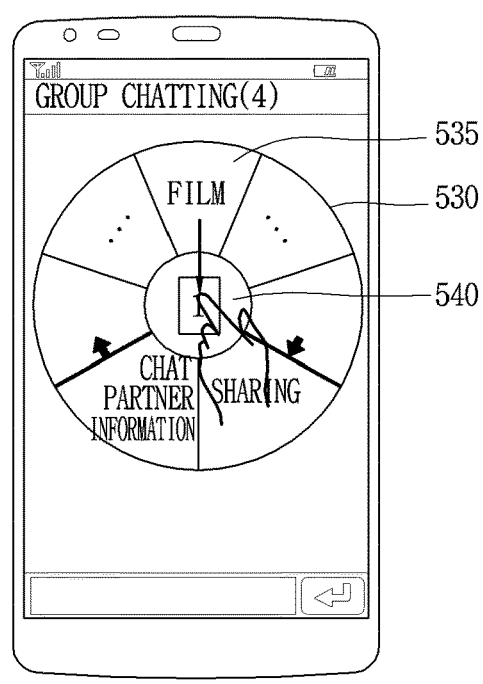
Figure 5C:
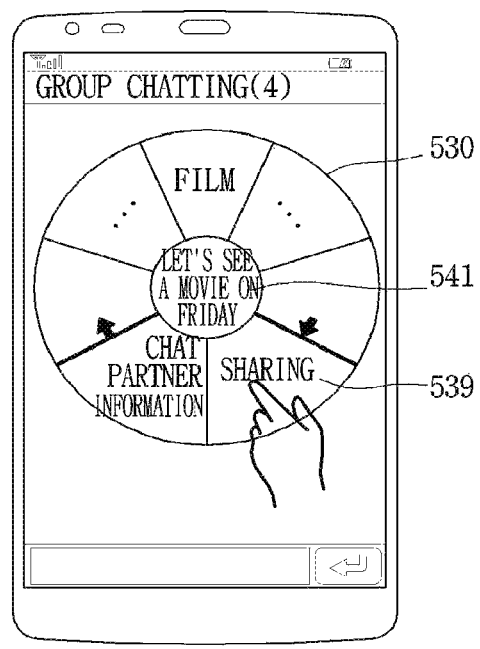
FIGS. 5C to 5E are examples to check and share a message stored in association with a specific person.
Figure 5D:
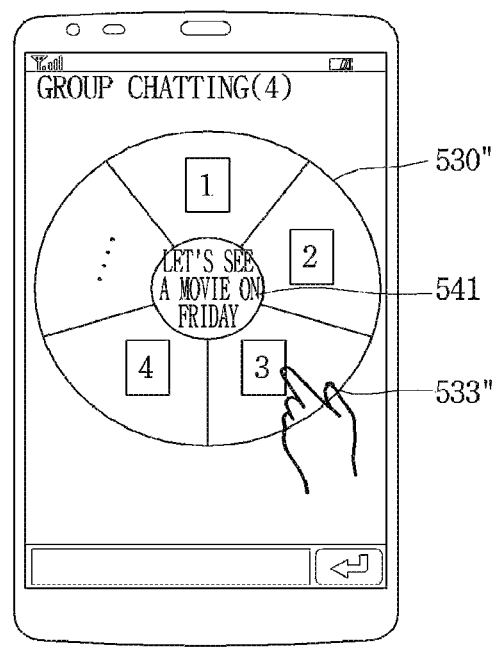
Figure 5E:
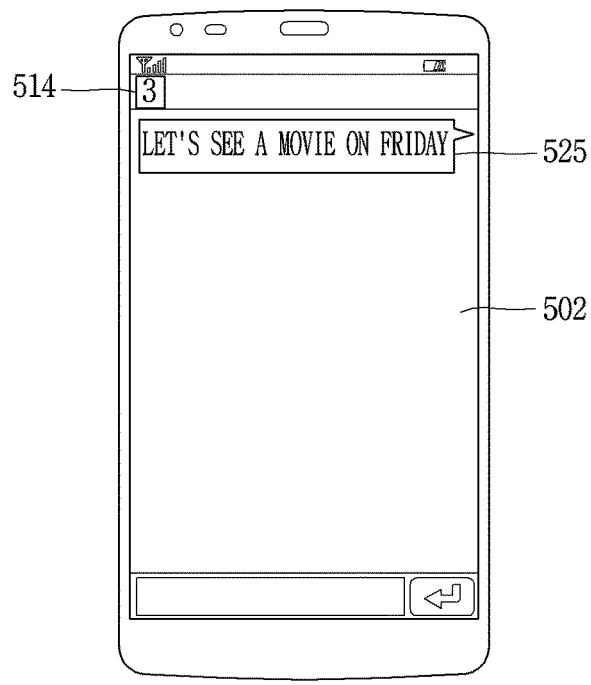

FIGS. 5A and 5B are views illustrating a method of storing a specific message among chat messages transceived with chat partners, in association with a specific person. And FIGS. 5C to 5E are examples to check and share the message stored in association with the specific person.

As shown in FIG. 5A, in an output state of a chat screen 501 for messages transceived with chat partners on the display unit 151, a touch input, to rub an image icon 512 for a specific chat partner (i.e., a second region) right and left a predetermined number of times, is applied (①). Then, if a drag input is applied (②) towards a first region where a corresponding message 521 has been output, the controller 180 may store the corresponding message 521 (e.g., 'Let's see a movie on Sunday.') in association with a chat partner corresponding to the image icon 512. Here, the order of the touch inputs is not limited to the illustrated one. For instance, a touch input starting from the specific message 521 may be dragged to the second region, and then a touch input may be input to rub the second region a predetermined number of times. In this case, the corresponding message 521 may be also stored in association with a chat partner corresponding to the second region 512.

As a condition to store the corresponding message 521, the controller 180 may set a condition to apply a touch input to the image icon 512 and then to apply the drag input within a predetermined time, or a condition that the drag input is out of a reference range (e.g., a minimum drag length is set, the drag input is out of a message region, or the drag input is dragged up to another one of the display unit 151).

The controller 180 may store the message 521 together with time information on a reception time of the message, and situation information. For instance, referring to FIG. 5A, time information on a reception time of the message 521, and previously-received messages may be automatically extracted to be stored together with the message 521.

The controller 180 may output a visually distinguishable mark (e.g., a different image, a different shape, a different transparency, a highlighting effect, etc.) to the stored messages. In this case, if a touch line of a preset shape is input to scrap information displayed on the menu region of the controller UI, the controller 180 may release a display state of messages corresponding to the scrap information.

Once a specific message is stored in association with a specific chat partner, as shown in FIG. 5B, a controller UI 530 may be automatically output, or the controller UI 530 may be output only when a touch input to rub the second region 512 right and left a predetermined number of times is applied.

As shown in FIG. 5B, an input region 540 which displays information on a chat partner corresponding to the second region 512 (e.g., an image icon) is displayed on an inner circle of the controller UI 530, and a menu region which displays scrap information stored in association with the corresponding chat partner is displayed on an outer circle of the controller UI 530. In FIG. 5A, it can be seen that scrap information about the stored message 521, e.g., a 'film' 535 is included in the menu region as an item.

While the controller UI 530 is being output, the chat screen 501 output to the entire region of the display unit 151 may be converted into a deactivated state. The chat screen is converted into an activated state again when the controller UI 530 disappears. As another example, it is possible to output the chat screen 501 of an activated state to one region of the display unit 151, and to output the controller UI 530 corresponding to a touch input to another region of the display unit 151, by reducing the size of the chat screen 501.

Referring to FIG. 5C, as scrap information ('film') is selected from the menu region of the controller UI 530, the chat partner information corresponding to the second region 512, which has been displayed on an input region 540, is converted into a message 541 corresponding to the selected scrap information 535 (e.g., 'Let's see a movie on Friday.'). Here, the selection of scrap information means dragging a touch input applied to a specific item on the menu region into the input region 540. With such a configuration, a user may check a message corresponding to the scrap information 535. Although not shown, time information and situation information stored together with a message corresponding to selected scrap information, may be further output to the input region 540.

Once a sharing function item 539 is selected from the menu region, the scrap information displayed on the menu region is converted into information on chat partners on the current chat screen, e.g., image icons. For instance, as shown in FIG. 5D, image icons corresponding to chat partners who are chatting with one another, are displayed on a menu region 530". If a chat partner to share the message 541 displayed on the input region is selected, i.e., if a short-touch input is applied to a third item 533" on the menu region 530", or if a drag input toward the input region is applied to the third item 533", the message 541 is immediately sent to the selected chat partner.

As a result, as shown in FIG. 5E, the chat screen 501 corresponding to a group chatting is converted into a chat screen 502 with the selected chat partner, and the sent message is displayed (525).

FIGS. 6A to 6D are exemplary conceptual views for explaining a message writing method using a message associated with a specific person, by using an output controller UI, in the mobile terminal according to an embodiment of the present invention.

Figure 6A:
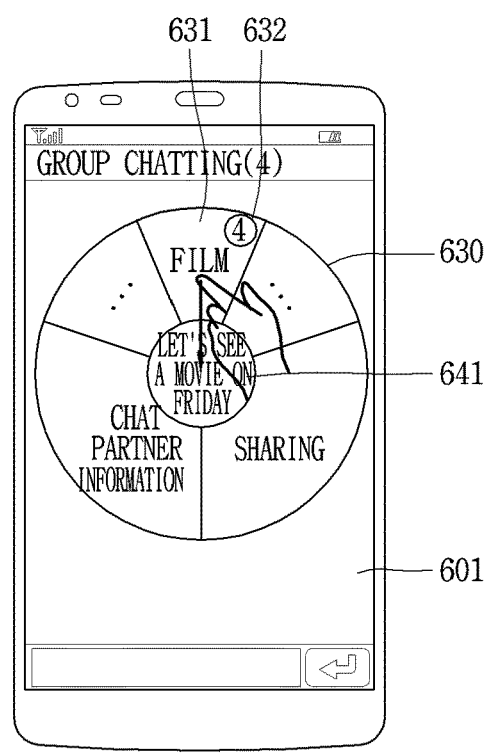
FIGS. 6A to 6D are exemplary conceptual views for explaining a message writing method using a message associated with a specific person, by using a controller UI, in a mobile terminal according to an embodiment of the present invention.

As shown in FIG. 6A, in a popped-up state of a controller UI 630 onto a chat screen 601, if a touch input applied to specific scrap information 631 is dragged to an input region 641, a message corresponding to the selected scrap information 631 (e.g., 'Let's see a movie on Friday.') is displayed on the input region 641.

Figure 6B:
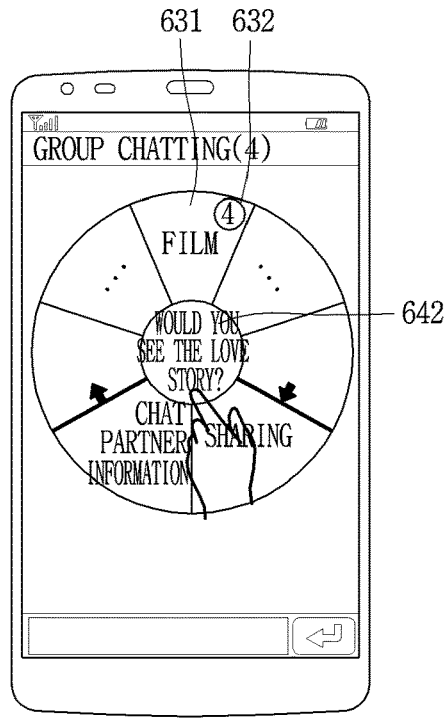

Here, if there are a plurality of messages corresponding to the scrap information 631, number information 632 indicating the number of messages (e.g., '④') may be displayed next to the scrap information. In a case where there are a plurality of messages corresponding to one scrap information 631, if a touch input applied to the scrap information 631 is dragged to the input region 641 as shown in FIG. 6B, a next message corresponding to the selected scrap information 631 (e.g., 'Do you want to see the love story?') is displayed (642) on the input region 641.

If a user's desired scrap information is not displayed on a menu region, a flicking touch input or a drag input may be applied to the menu region in a direction indicated by an arrow image object. As a result, the controller 180 may rotate the menu region along the touch input or the drag input, in a fixed state of the input region of the controller UI. As the menu region is rotated, at least part of the displayed scrap information disappears, and at least part of next scrap information is displayed. If the scrap information is rotated completely, the initial scrap information such as a circle queue may be output to the menu region.

Figure 6C:
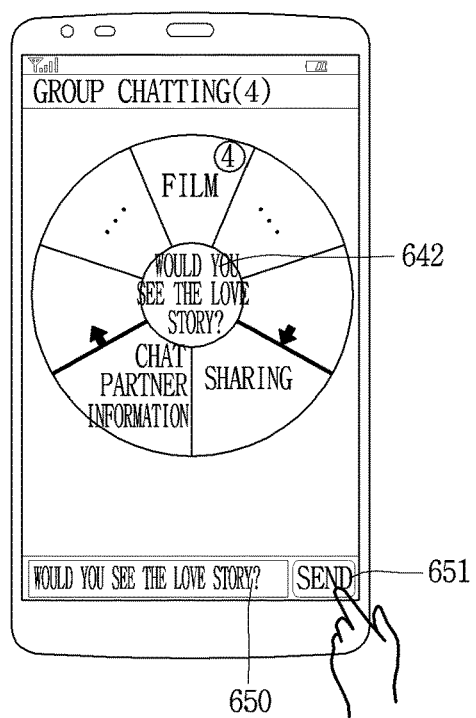
Figure 6D:
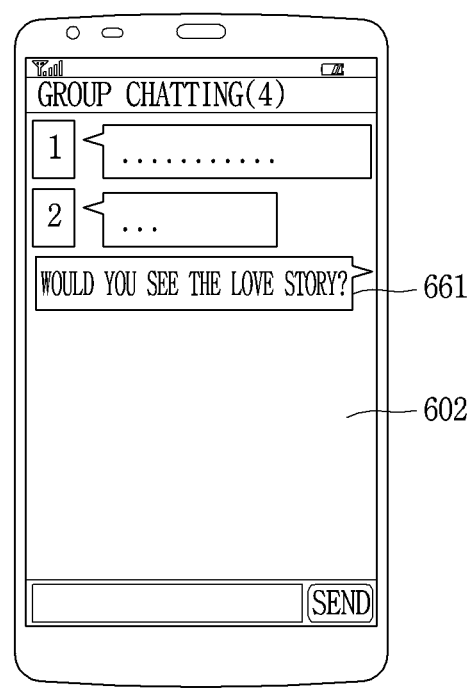

In a displayed state of the user's desired message 642 on the input region, if a preset touch input (e.g., a short touch input) is applied to the input region, the controller 180 controls the message ('Do you want to see the love story?') to be input to a message writing region 650. The message input to the message writing region 650 is sent to chat partners who are in the group chatting, as a push input is applied to a send key 651 adjacent to the message writing region. And the controller UI disappears. As a result, as shown in FIG. 6D, the sent message is displayed (661) on a chat screen 602. Referring to FIG. 6C, the message input to the message writing region 650 may be changed or modified by using a virtual keyboard or a virtual input region popped-up as the message writing region 650 is touched.

Although not shown, in a displayed state of at least one message on the input region, if a different touch input (e.g., a long touch input) is applied to the input region, the controller UI disappears, and the current chat screen is moved into a chat screen corresponding to an output position of the at least one message. For instance, the current chat screen is scrolled to be moved to the position where the message ('Do you want to see the love story?') displayed in FIG. 6C has been firstly output. Here, if the corresponding message is deleted, guidance information such as 'There is no corresponding message.' may be output.

FIGS. 7A to 7D are exemplary conceptual views for explaining a method of checking a message associated with a specific person by using a controller UI, in the mobile terminal according to an embodiment of the present invention.

Figure 7A:
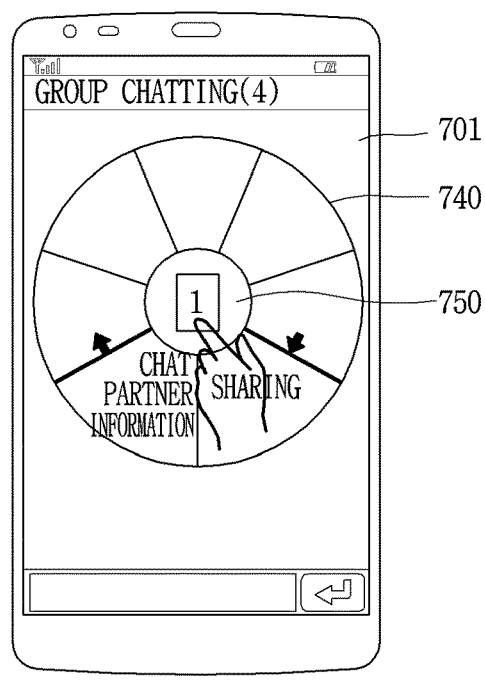
FIGS. 7A to 7D are exemplary conceptual views for explaining a method of checking a message associated with a specific person, by using a controller UI, in a mobile terminal according to an embodiment of the present invention.

As shown in FIG. 7A, if a controller UI 740 is popped-up on a chat screen 701, an image icon (e.g., '①') corresponding to a selected chat partner is displayed on an input region 750 of the controller UI 740, and scrap information related to the selected chat partner is displayed on a menu region.

If a touch input is applied to the input region 750 before at least one scrap information is selected from the menu region, the controller 180 may convert the scrap information displayed on the menu region, into another item related to a chat partner corresponding to the image icon (e.g., '①') displayed on the input region. Here, said another item related to a chat partner may include chat partner information extracted from address information stored in the mobile terminal 100, schedule information, memos, images, phone records information, message record information, etc., and functions related thereto. Further, the information and the functions may be displayed in a converted state to texts or images which represent each of the information and the functions. For instance, as shown in FIG. 7B, texts or images, which indicate an image related to a chat partner corresponding to the image icon (e.g., '①'), job information 742, phone records information, message record information and e-mail information, may be displayed on the menu region, as said another item related to a chat partner.

Figure 7B:
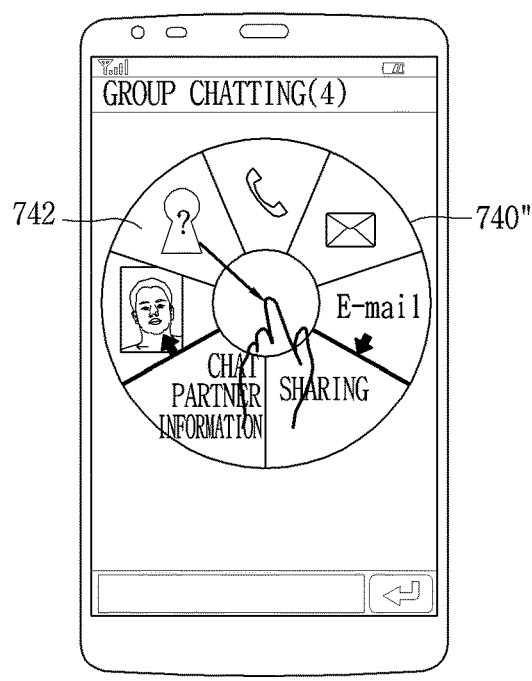
Figure 7C:
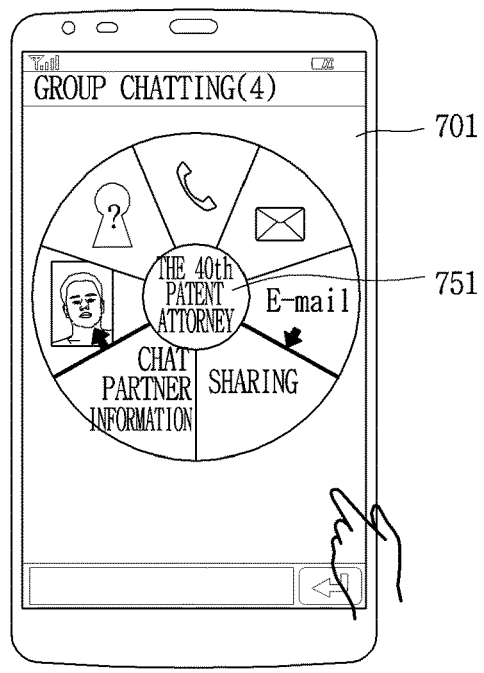

If the job information 742 is dragged to the input region 750 in FIG. 7B, stored job information, e.g., text information such as 'I'm a patent attorney in the $40^{th}$ year.' may be displayed on the input region 750 as shown in FIG. 7C.

Figure 7D:
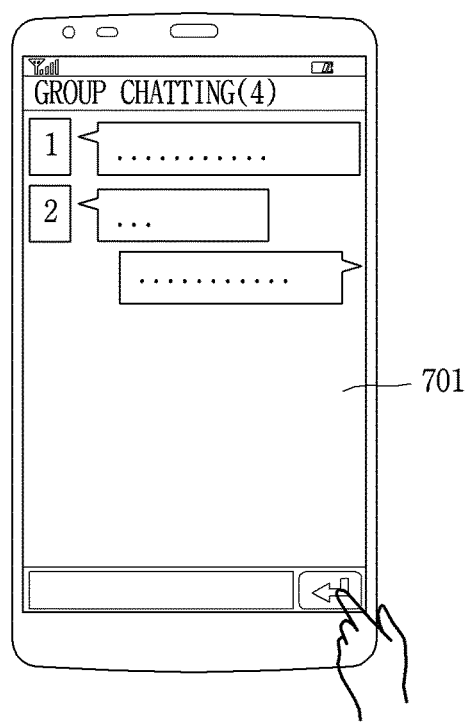

If a user wishes to merely check job information of the chat partner, as a touch input is applied to a region outside the controller UI as shown in FIG. 7C, the controller 180 may control the output controller UI to immediately disappear, and may control the previous chat screen 701 to be in an activated state as shown in FIG. 7D.

Although not shown, said another item related to a chat partner may be changed through a user input. For instance, as a long touch input is applied to the job information 742 shown in FIG. 7B, a virtual keyboard or a virtual input region may be popped-up on the display unit 151. Then, the controller 180 may update contents of the corresponding item 742, based on information input through the virtual keyboard or the virtual input region.

In the aforementioned embodiments, a user may immediately store a desired message or information with respect to a specific person while chatting, and may immediately check a stored message or information on a specific person while chatting, or may write a message using the message or the information.

Figure 8A:
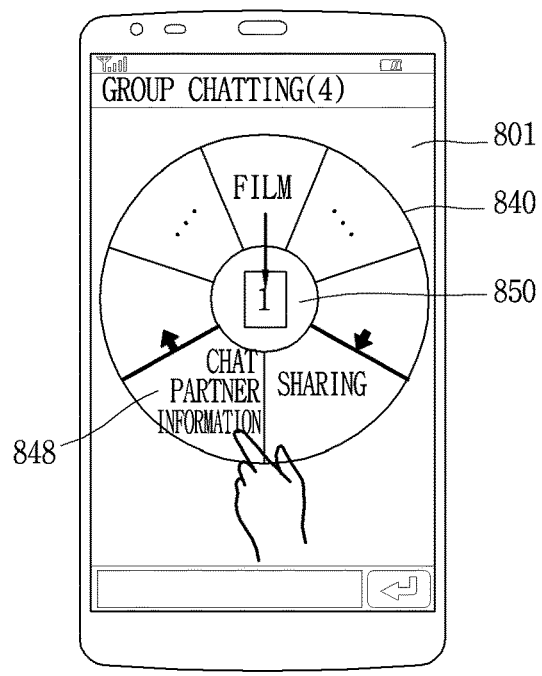
FIGS. 8A to 8C are exemplary conceptual views for explaining a method of selecting a chat partner by using a controller UI, in a mobile terminal according to an embodiment of the present invention.
Figure 8B:
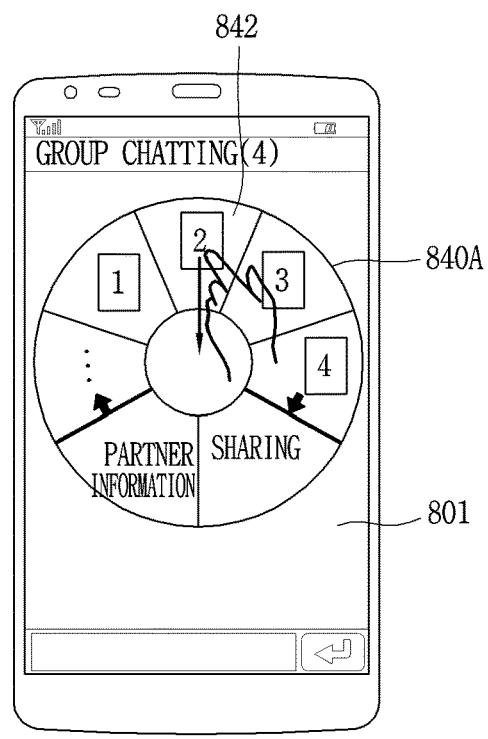
Figure 8C:
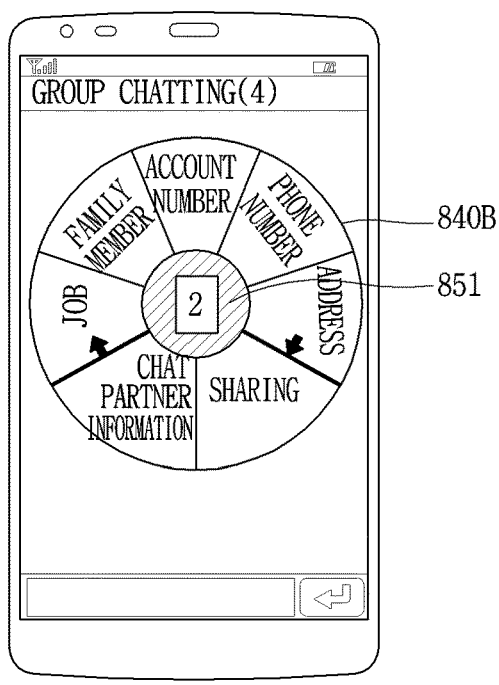

FIGS. 8A to 8C are exemplary conceptual views for explaining a method of selecting a chat partner by using a controller UI, in the mobile terminal according to an embodiment of the present invention.

As a preset touch input is applied to a region which displays specific chat partner information on a group chatting screen, a controller UI is popped-up. As a result, as shown in FIG. 8A, the specific chat partner information corresponding to the region where the preset touch input has been received, is displayed within an input region 850 of the controller UI 840.

Here, if a 'chat partner information' item 848 rather than scrap information is selected from a menu region 840, or if a touch input is applied to the input region 850, information on chat partners who are performing a group chatting (e.g., image icons such as ①, ②, ③, ④), rather than scrap information, is displayed on the menu region 840A as shown in FIG. 8B. Here, the chat partner information displayed on the input region 850 disappears. If specific chat partner information (②) is selected from the menu region 840A, the selected specific chat partner information is displayed on the menu region, as shown in FIG. 8C. And scrap information related to the selected specific chat partner information (②) is displayed on a menu region 840B. The display order of the scrap information may be preferentially based on a message storage order, or a correlation degree with the specific chat partner (e.g., a frequently-used message, etc.). In case of changing the selected chat partner, the 'chat partner information' item 848 may be selected from the menu region 840B. As a result, the current screen is converted into the screen shown in FIG. 8B.

FIGS. 9A to 9D are exemplary conceptual views for explaining a method of adding a chat partner to a group chatting by using a controller UI, in the mobile terminal according to an embodiment of the present invention.

Figure 9A:
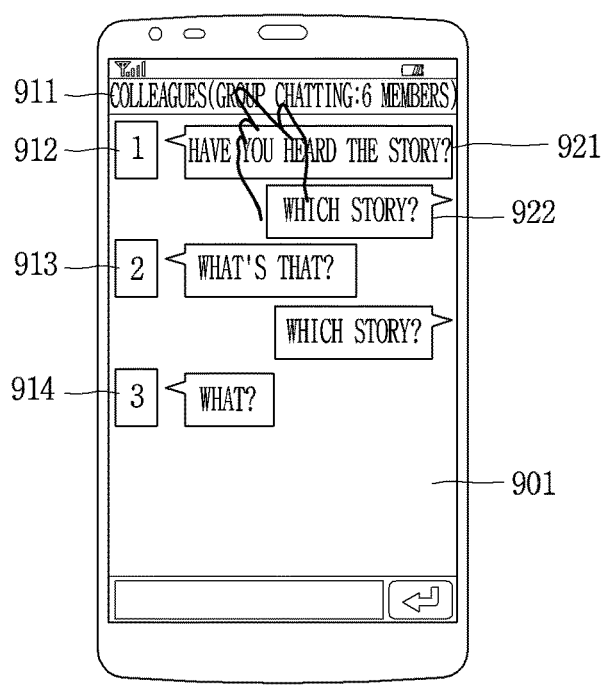
FIGS. 9A to 9D are exemplary conceptual views for explaining a method of adding a chat partner by using a controller UI, in a mobile terminal according to an embodiment of the present invention.

As shown in FIG. 9A, in an output state of a chat screen 901, even if a touch input is applied to rub a chatting room information display region 911 displayed on an upper end of the display unit 151, right and left a predetermined number of times, the controller 180 may pop-up the aforementioned controller UI on the chat screen 901.

Figure 9B:
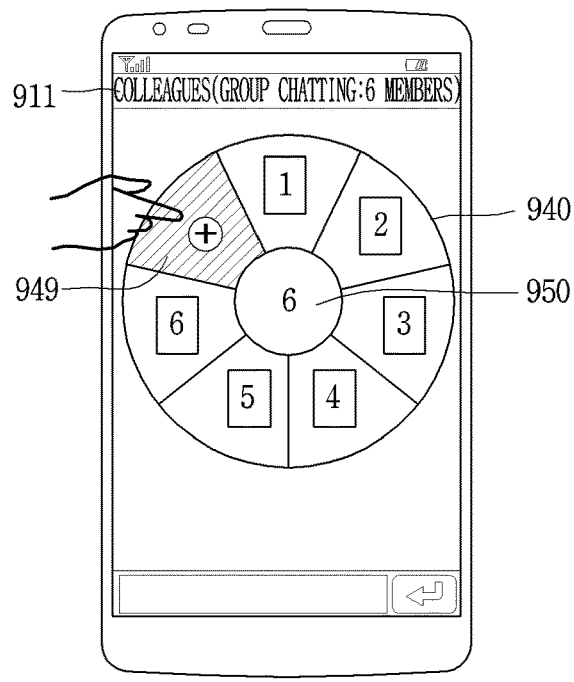
Figure 9C:
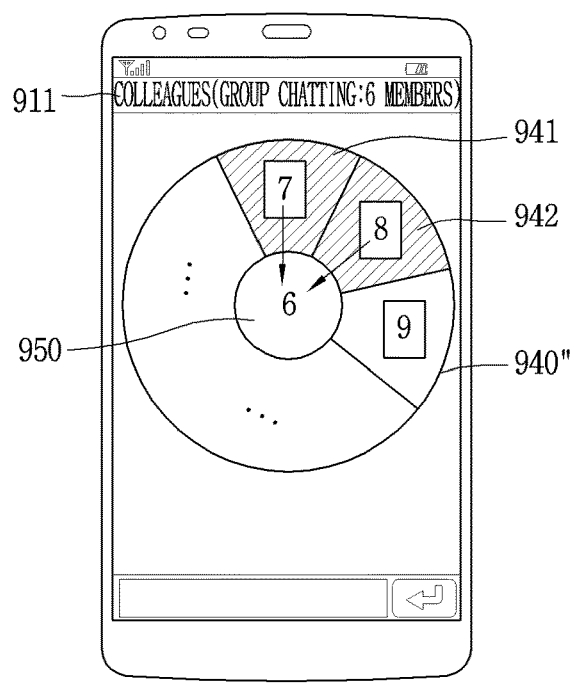

In this case, as shown in FIG. 9B, a chat partner adding icon (e.g., '+') 949 is displayed on a menu region 940 of the popped-up controller UI, together with information on chat partners who are performing a group chatting (e.g., image icons such as ①, ②, ③, ④, ⑤, ⑥). If the chat partner adding icon (e.g., '+') 949 is selected, the controller 180 may display, on a menu region 940", information on chat partners who are not performing the group chatting, as shown in FIG. 9C. Here, the display order of the chat partners may be based on a storage order of the chat partners, or based on a preset priority such as a frequently-contacting chat partner.

Figure 9D:
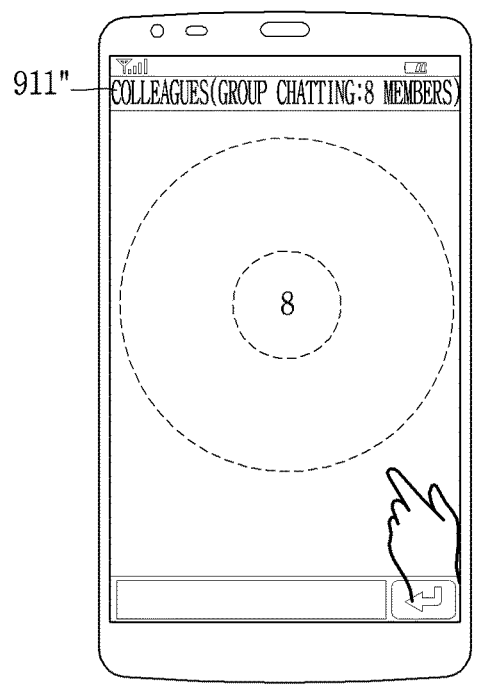

If a drag input is applied to drag desired other chat partner information 941, 942 towards an input region, as shown in FIG. 9D, the selected other chat partners are invited to the current group chatting. As a result, information (e.g., '8') indicating the addition of the chat partners is displayed on an input region 951 of the controller UI, and on a chatting room information display region 911".

Although not shown, a chat partner desired to leave among the chat partners who are performing the group chatting may be made to leave (be out of) the chatting room, by dragging desired chat partner information among the chat partner information (e.g., image icons such as ①, ②, ③, ④, ⑤, ⑥), to a region out of the controller UI.

FIGS. 10A to 10C, and 11A to 11C are exemplary conceptual views for explaining a method of differently processing messages related to a specific person, by using a controller UI, in the mobile terminal according to an embodiment of the present invention.

Figure 10A:
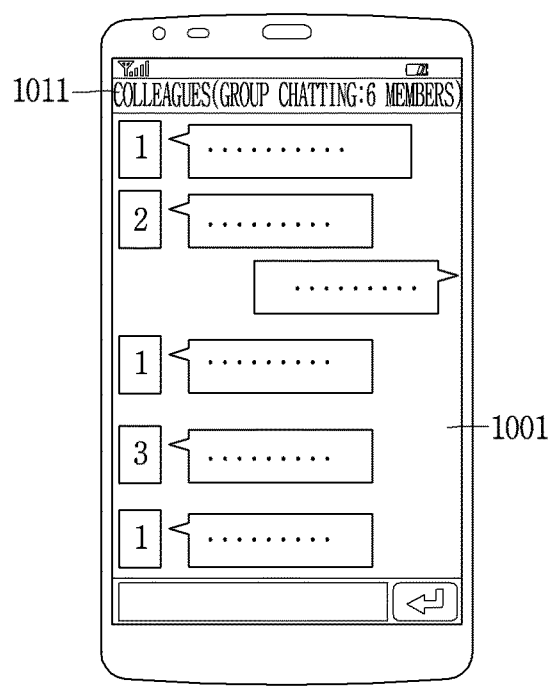
FIGS. 10A to 10C, and 11A to 11C are exemplary conceptual views for explaining a method of differently processing messages related to a specific person, by using a controller UI, in a mobile terminal according to an embodiment of the present invention.
Figure 10B:
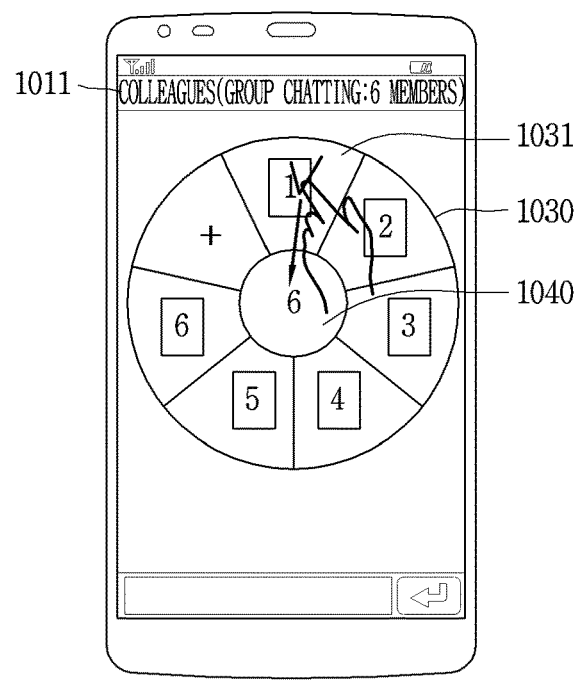
Figure 10C:
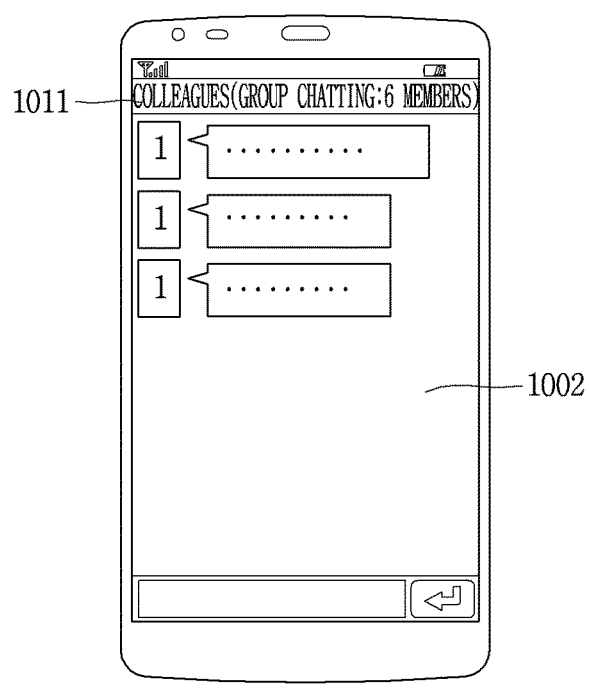

More specifically, FIGS. 10A to 10C show a method of controlling a screen such that only messages received from a specific person are displayed on a chat screen 1001, by using a controller UI.

Referring to FIG. 10A, if a preset touch input is applied to a chatting room information display region 1011 (e.g., if a touch input to rub the chatting room information display region 1011 right and left is applied), the controller 180 may output a controller UI to a chat screen 1001. As shown in FIG. 10B, a menu region 1030 which displays icons indicating information on chat partners who are chatting may be displayed on the output controller UI. And an input region 1040 may be displayed on an inner circle of the menu region 1030.

If a touch line of a first shape (e.g., a 'v'-pattern) is drawn on one (e.g., ①) 1031 of icons displayed on the menu region 1030, and then if a drag input toward the input region 1040 is received, the controller 180 may extract only messages received from a chat partner corresponding to the one icon, and may output the messages to the display unit 151. As a result, as shown in FIG. 10C, only the messages sent from the (①) during the same group chatting are output. If a touch input is applied to the chatting room information display region 1011, or if a message is received from another chat partner, the controller 180 may convert a chat screen 1002 where the messages sent from the (①) have been output, into the previous chat screen 1001. Accordingly, since a user can see only messages sent from a specific person in a group chatting room, user' convenience is enhanced.

Figure 11A:
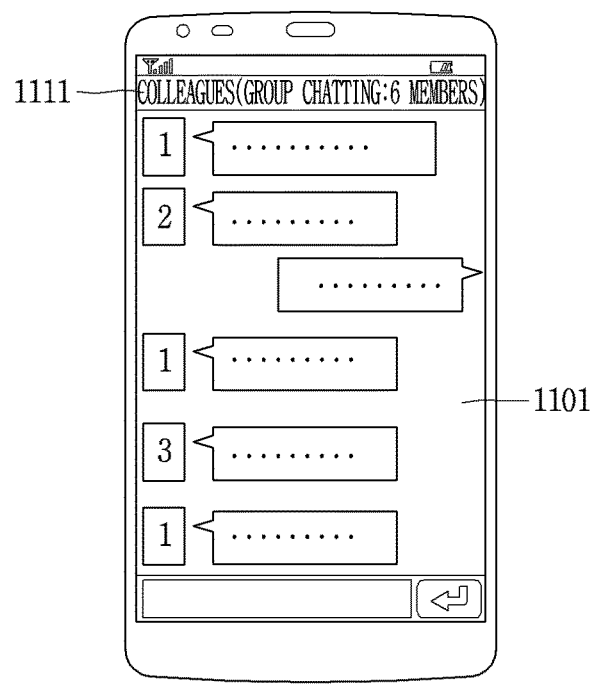
Figure 11B:
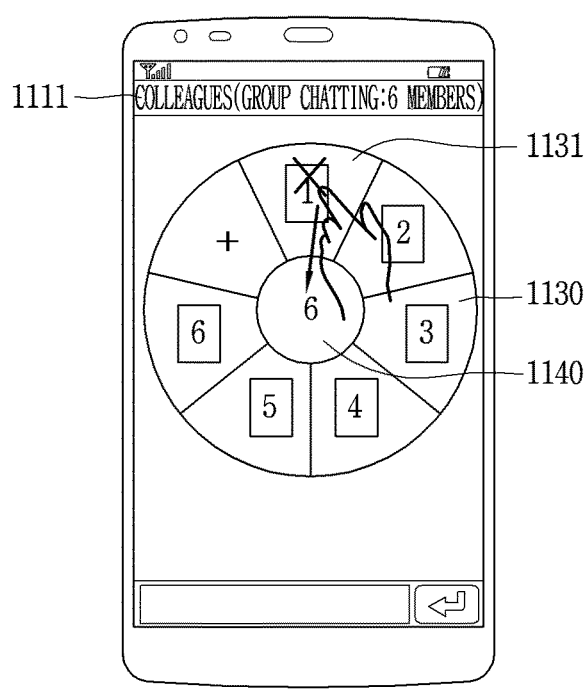
Figure 11C:
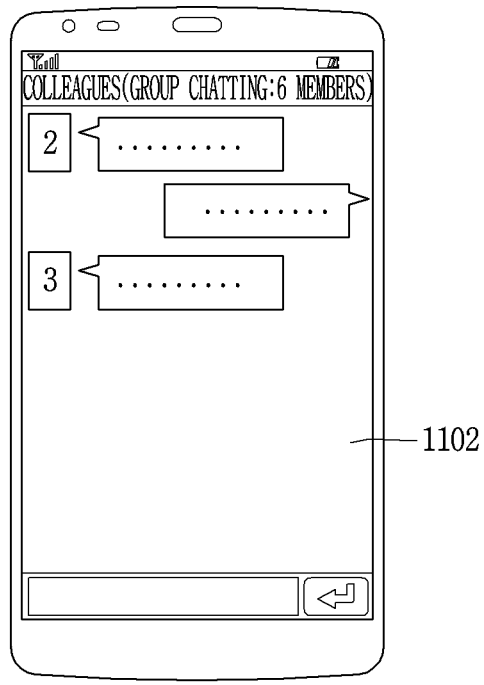

FIGS. 11A to 11C show a method of controlling a screen such that messages received from a specific person are not displayed on a chat screen 1101, by using a controller UI.

Referring to FIG. 11A, if a preset touch input is applied to a chatting room information display region 1111 (e.g., if a touch input to rub the chatting room information display region 1111 right and left is applied), the controller 180 may output a controller UI to a chat screen 1101. If a touch line of an 'x'-pattern indicating a deletion is drawn on a specific icon (e.g., ①) 1131 indicating information on a chat partner who is chatting and displayed on a menu region of the output controller UI 1130, and then if a drag input toward an input region 1140 is received, the controller 180 may extract only messages received from the chat partner corresponding to the one icon, and may control the extracted messages not to be output to the display unit 151. As a result, as shown in FIG. 11C, only the messages sent from the (①) during the same group chatting may not be output (1102). Here, even if a new message is received from the selected chat partner, the controller 180 may not display the new message on a chat screen. If a touch input is applied to the chatting room information display region 1111, the controller 180 may convert the current chat screen into the previous chat screen 1101 which includes the messages sent from the (①). With such a configuration, when a user does not wish to view messages sent from a specific person in a group chatting room, the messages are processed not to be displayed. This may implement a more user customized display method.

FIGS. 12A to 12C, 13A to 13D, 14A and 14B, 15A and 15B, 16A to 16D, 17A and 17B, and 18A to 18C are exemplary conceptual views for explaining a method of performing a blind chatting with a specific person, by using a controller UI, in the mobile terminal according to an embodiment of the present invention. Especially, the drawings show that a blind chatting is displayed within a current group chatting screen or is displayed together therewith.

Figure 12A:
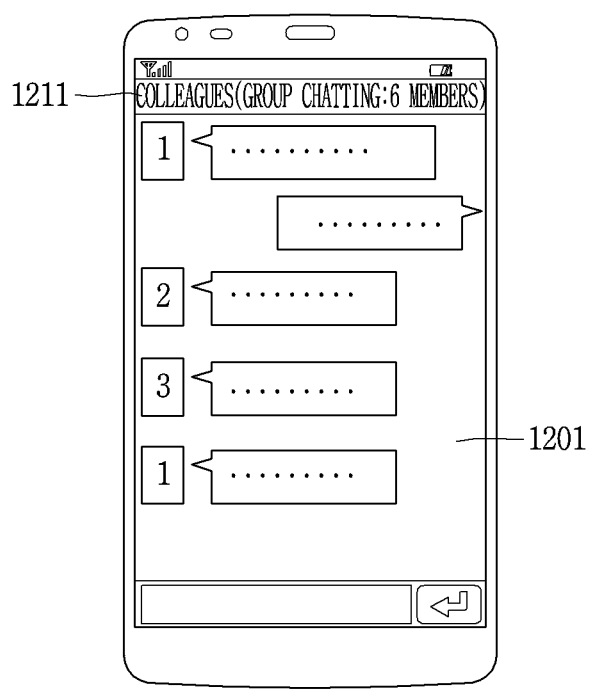
FIGS. 12A to 12C, 13A to 13D, 14A and 14B, 15A and 15B, 16A to 16D, 17A and 17B, and 18A to 18C are exemplary conceptual views for explaining a method of performing a blind chatting with a specific person, by using a controller UI, in a mobile terminal according to an embodiment of the present invention.
Figure 12B:
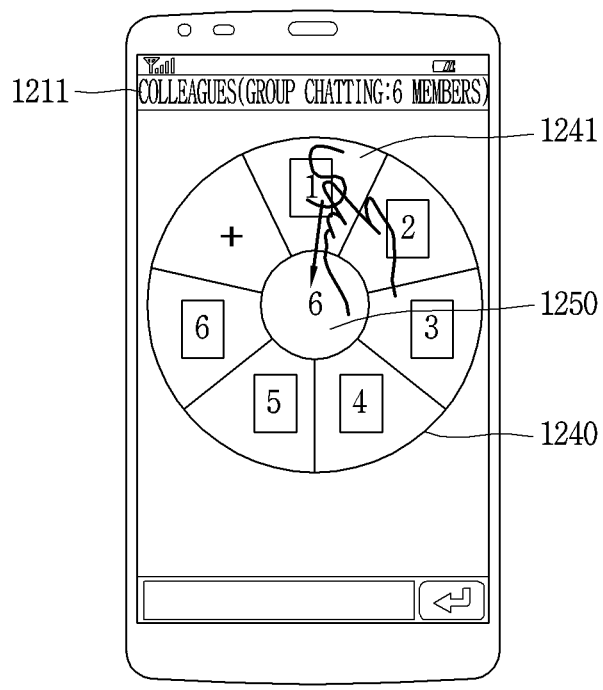

Referring to FIG. 12A, if a preset touch input is applied to a chatting room information display region 1211 (e.g., if a touch input to rub the chatting room information display region 1211 right and left is applied), the controller 180 may output a controller UI to a chat screen 1201. If a touch line of a second shape indicating a secret chat (e.g., an 's'-pattern) is drawn on a specific icon (e.g., ①) 1241 indicating information on a chat partner who is chatting and displayed on a menu region 1240 of the output controller UI, and then if a drag input toward an input region 1250 is received, the controller 180 may perform a blind chatting with the chat partner corresponding to the specific icon. That is, the controller 180 may control subsequently-written messages to be sent to only the selected chat partner (e.g., ①). In a case where it is difficult to draw a touch line of a specific shape within the corresponding item 1241, if a pinch-out touch input or a double short-touch input is applied to the corresponding item 1241, the size of the corresponding item 1241 may be increased to a predetermined value while non-selected other items maintain their size.

If the selected chat partner agrees to the blind chatting, messages sent from the ① during the current group chatting may be received only on the user's terminal (the mobile terminal). Even in this case, messages among other chat partners are displayed on the current chat screen in real time.

Once the blind chatting is performed, the controller 180 may display messages corresponding to the blind chatting, on blind regions distinguished from other messages. Here, other messages may be displayed among the plurality of blind regions.

Figure 12C:
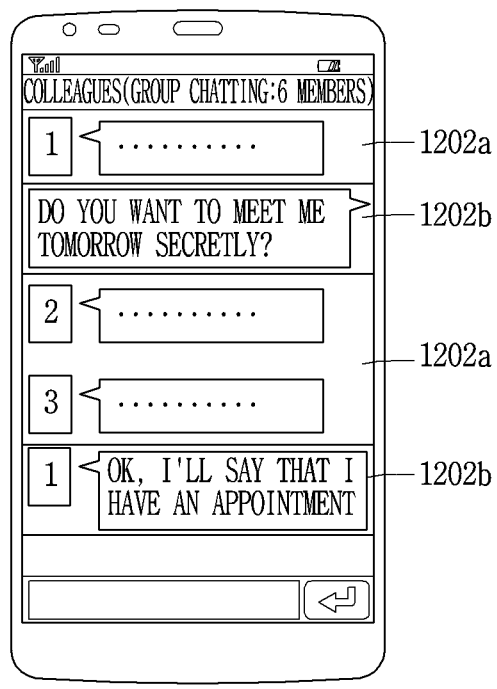

For instance, as shown in FIG. 12C, if messages sent to the ① from the user and messages received from the ① who has agreed to the blind chatting are displayed on blind regions 1202b in real time, and messages among other chat partners are displayed in real time. As a result, as shown, a plurality of blind regions may be displayed among regions which display messages among other chat partners. Further, a notification indicating that the blind chatting is being performed within the chat screen (e.g., '2 blind chatters') may be output to the chatting room information display region 1211.

Figure 13A:
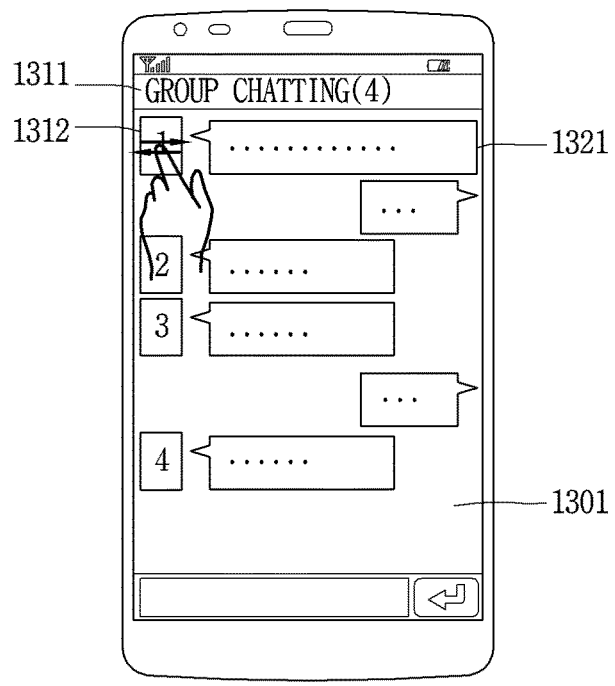
Figure 13B:
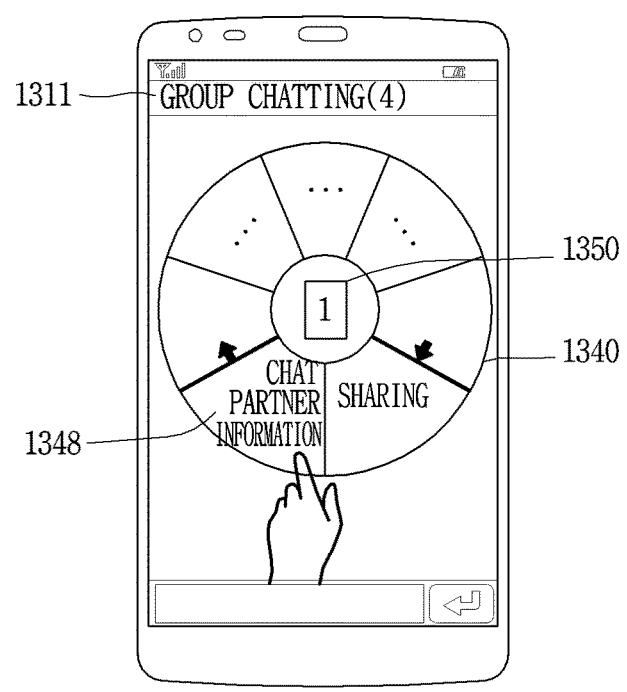

FIGS. 13A and 13B show another method of starting a blind chatting with a specific person by using a controller UI.

Referring to FIG. 13A, if a touch input to rub right and left is applied to a region 1312 which displays information on a chat partner who is to perform a blind chatting, on a group chatting screen 1301, the controller 180 may output a controller UI to the chat screen 1301, as shown in FIG. 13B. If an item of 'chat partner information' is selected from a menu region 1340 of the output controller UI, the controller 180 may convert scrap information displayed on the menu region 1340, into information on group chatters (e.g., icons).

Figure 13C:
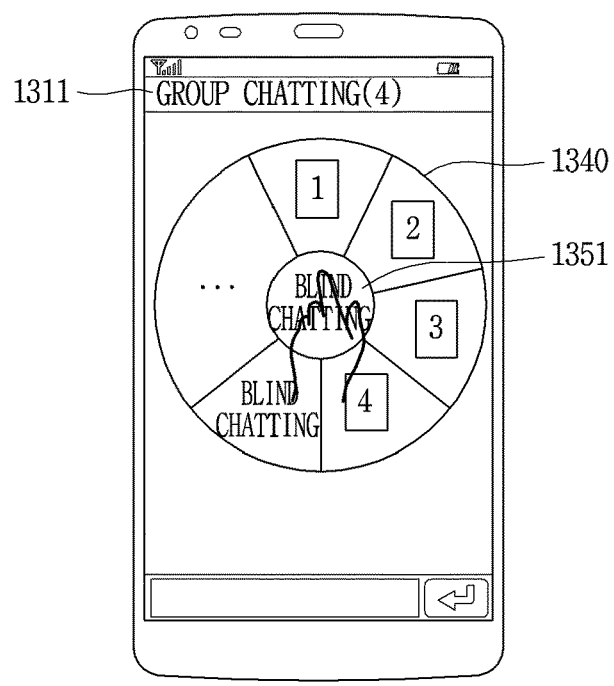
Figure 13D:
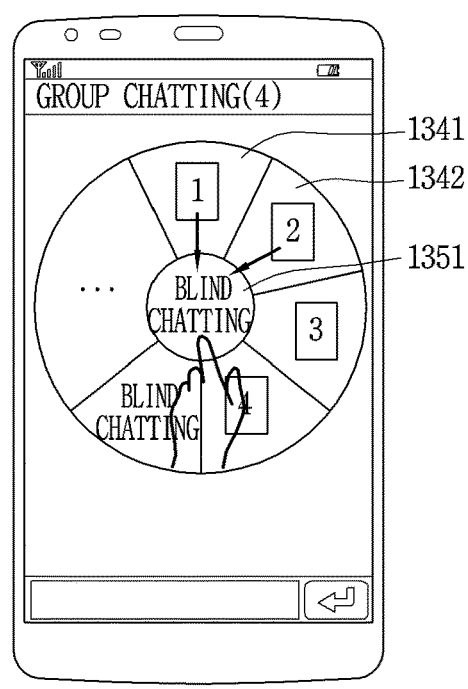

Here, if a touch input is applied to an input region 1350 before a specific person is selected from the menu region 1340, a message indicating 'blind chatting' is output to the input region 1350, as shown in FIG. 13C. Then, the controller 180 may control a user to perform a blind chatting with the selected specific partner. For instance, as shown in FIG. 13D, if ① and ② are sequentially selected from a menu region 1340" to be dragged to the input region 1350, the controller 180 may control the user to perform a blind chatting with the ① and ② on the group chatting screen 1301.

FIGS. 14A and 14B, 15A and 15B, 16A to 16D, 17A and 17B, and 18A to 18C show in detail a method of controlling a screen corresponding to a started blind chatting, by using a controller UI.

Figure 14A:
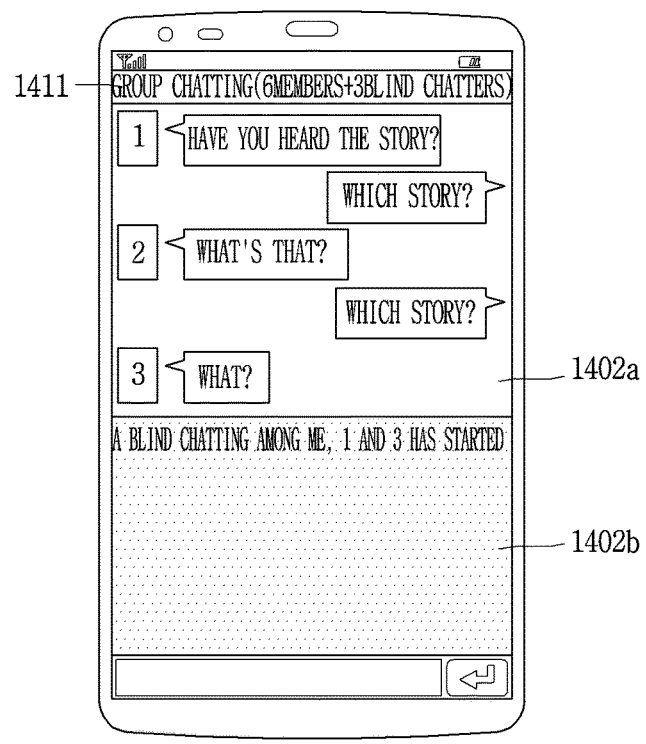
Figure 14B:
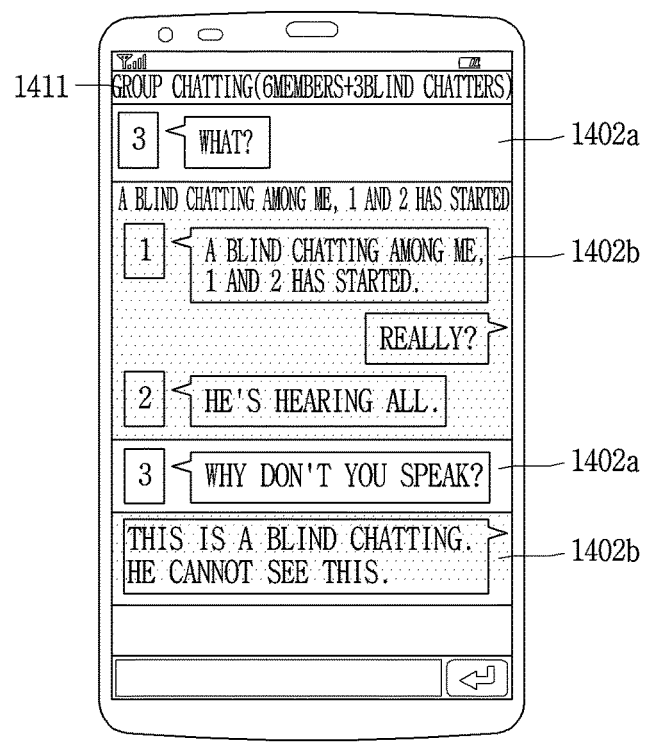

As aforementioned, once a blind chatting is started by using a controller UI, as shown in FIG. 14A, information on chat partners who are performing a group chatting (e.g., 4) and information on chat partners who are performing a blind chatting (e.g., 2) are displayed together on a chatting room information display region 1411. Accordingly, the display unit 151 displays in real time a region 1402a which displays a chat screen corresponding to a group chatting, and a blind region 1402b which displays a chat screen corresponding to a blind chatting. Once a blind chatting is started, information on chat partners who are performing the blind chatting, and information indicating the start of the blind chatting (e.g., 'Blind chatting is started'.) are output to the blind region 1402b.

Then, chats among chat partners who are performing the blind chatting are displayed on the blind region 1402b, and chats among other chat partners who are not invited to the blind chatting are displayed in real time on the region 1402a which is visually distinguished from the blind region. For instance, a shadow effect, a 3D effect, a different background screen, or a different speech balloon, which is visually differentiated, may be output to the blind region.

If a user who is performing the blind chatting wishes to chat with other uninvited chat partners, the user may touch the region 1402a once to write a message. As a result, the controller 180 may control the written message to be sent to all of the chat partners who are performing the group chatting. In this case, the sent message is displayed on the region 1402a distinguished from the blind region.

Further, the controller 180 may control only chats corresponding to the blind chatting to be output to the display unit 151, or controls the blind chatting to be terminated, based on a touch input applied to the blind region.

Figure 15A:
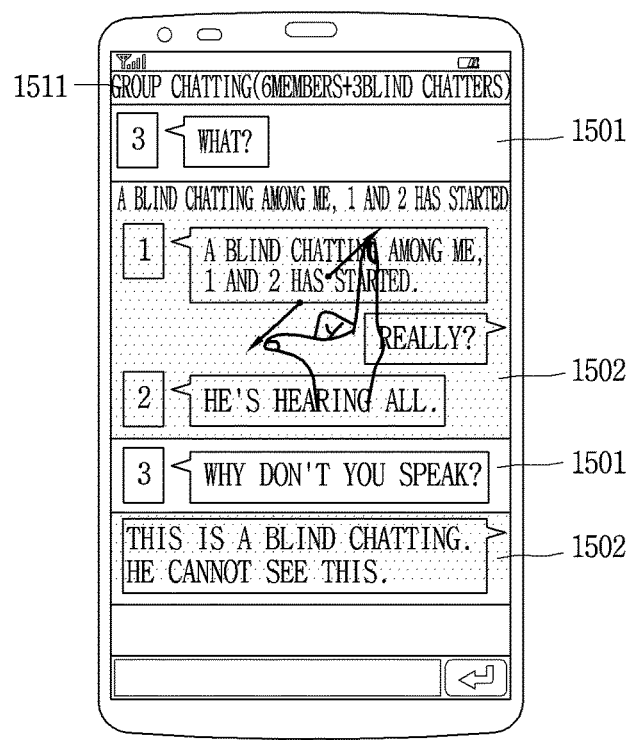
Figure 15B:
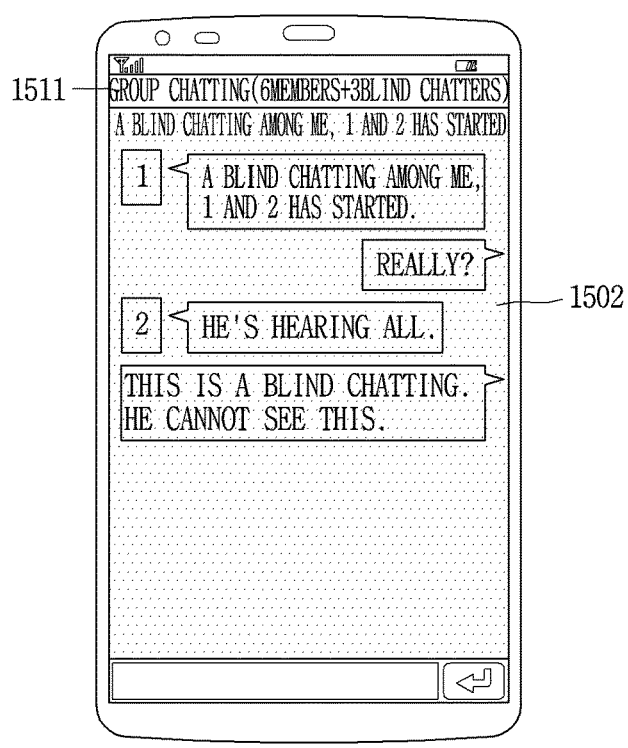

For instance, as shown in FIGS. 15A and 15B, if a pinch-out touch input to widen fingers by more than a predetermined value is applied to a specific blind region 1502, the controller 180 may execute a screen extending function such that only a chat screen corresponding to a blind chatting may be output to the entire region of the display unit 151.

Figure 16A:
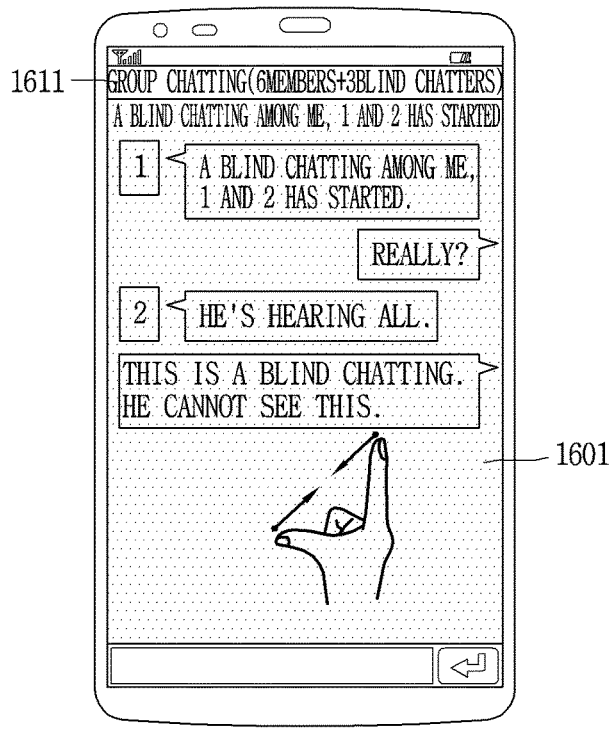
Figure 16B:
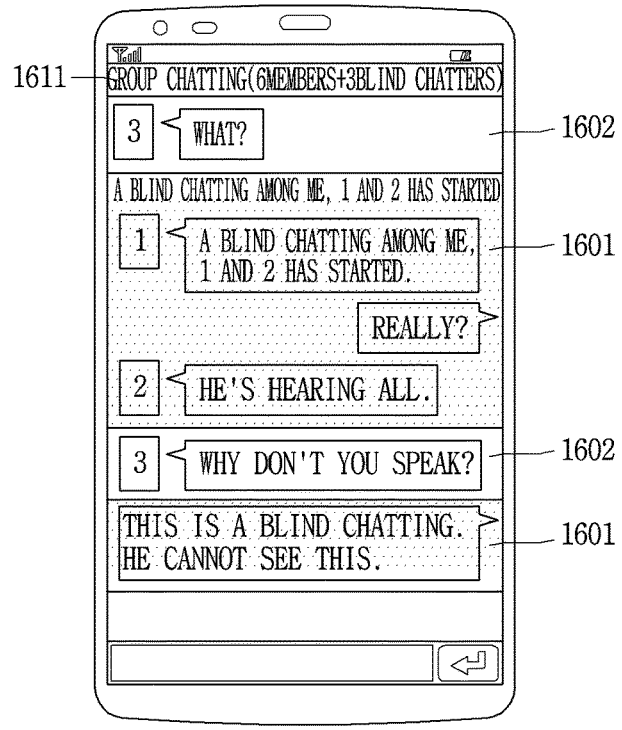
Figure 16C:
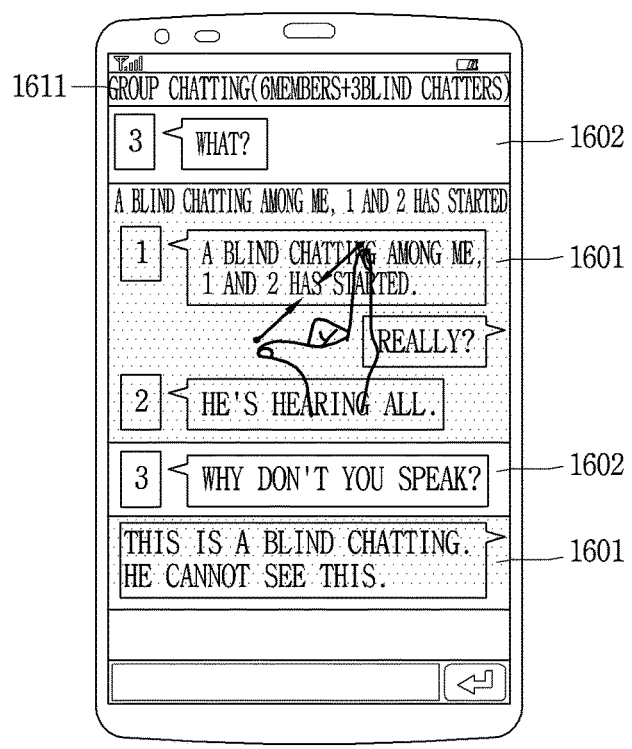
Figure 16D:
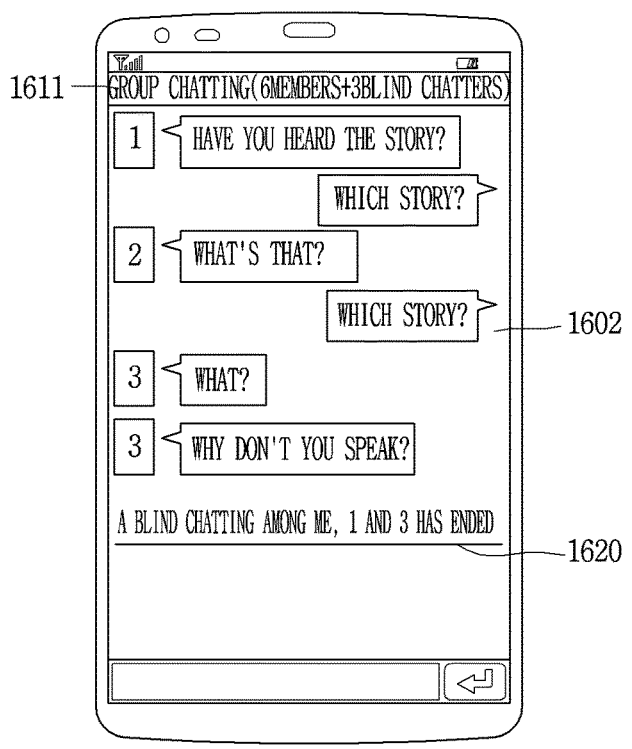

On the other hand, as shown in FIGS. 16A to 16D, if a pinch-in touch input to narrow fingers by more than a predetermined value is applied to a specific blind region 1601, the controller 180 may execute a screen contracting function such that a blind region and other region may be displayed together. And the controller 180 may gradually contract the blind region in proportion to the pinch-in touch input. In a state that the blind region is too small to be contracted any longer, if a pinch-in touch input is received, the controller 180 may terminate the blind chatting. As a result, as shown in FIG. 16D, only a previous group chatting screen 1602 is output to the display unit 151, and a message 1620 indicating the termination of the blind chatting may be output to the user's terminal.

Further, the controller 180 may invite a specific person to the blind chatting or may make a specific person leave the blind chatting room, based on a touch input applied to a region which displays a blind chatter on the blind region.

Figure 17A:
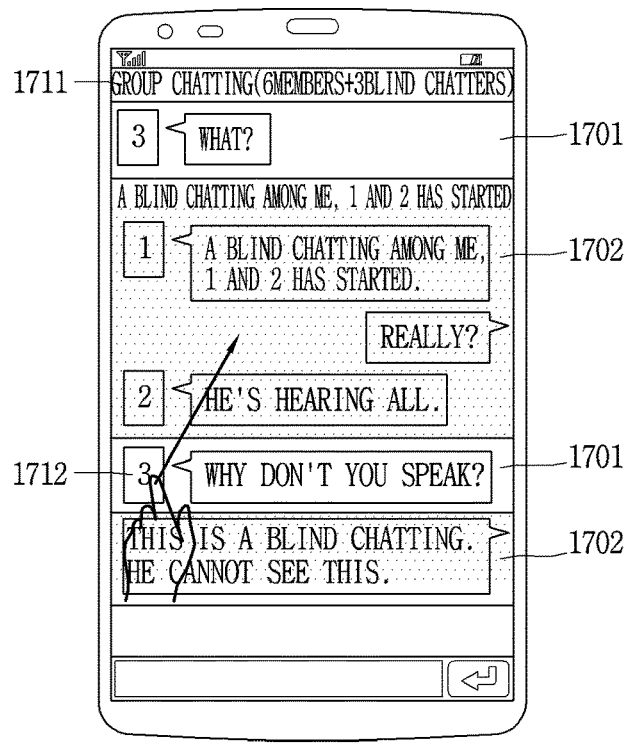
Figure 17B:
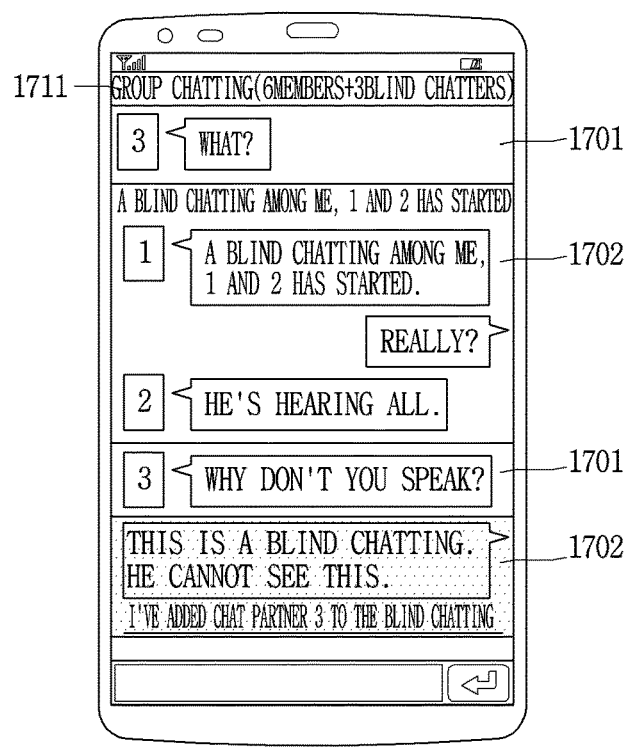

For instance, referring to FIGS. 17A and 17B, a blind region 1702, and a region 1701 which displays chats of a chat partner uninvited to a blind chatting, are displayed on the display unit 151. In this state, if a touch input applied to a region 1712 indicating information on a specific person on the region 1701 (e.g., a region 1712 which displays an icon) is moved to the blind region 1702, the controller 180 may invite the specific person to the blind chatting. As a result, as shown in FIG. 17B, a message 1720 indicating that the specific person has been invited to the blind chatting may be output to the blind region 1702.

Figure 18A:
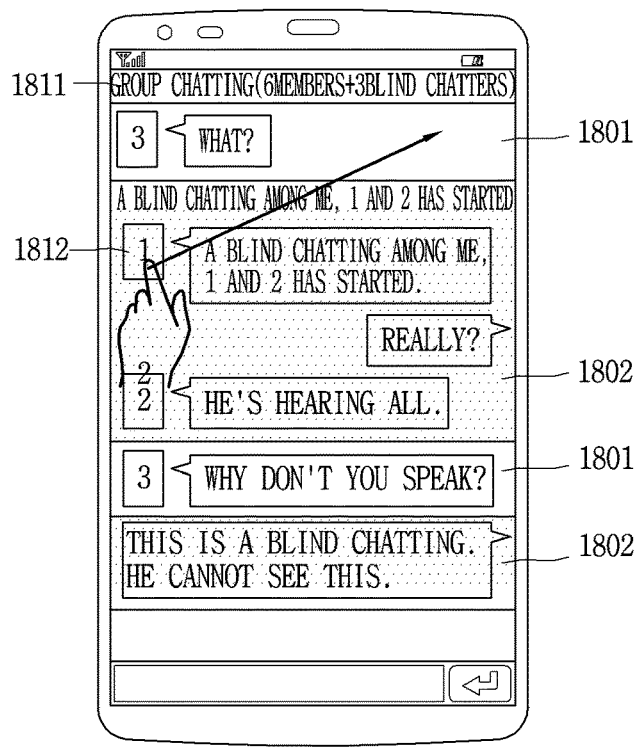
Figure 18B:
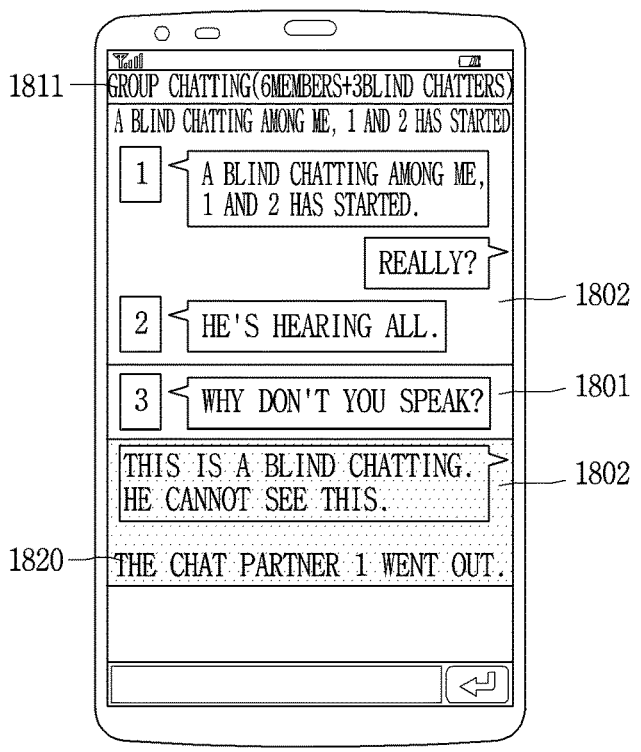

On the other hand, as shown in FIGS. 18A and 18B, if a touch input applied to a region 1812 indicating information on a specific person on a blind region 1802 (e.g., a region 1812 which displays an icon) is moved to a region 1801 out of the blind region, the controller 180 may recognize the input as a control command to make the specific person leave the blind chatting room. As a result, as shown in FIG. 18B, a message 1820 indicating that the specific person corresponding to the region 1812 has left the blind chatting room may be displayed on the user's terminal.

Although not shown, if a touch input applied to a message display region indicating a message transceived with a specific person on the blind region 1802 is moved to the region 1801 out of the blind region, the controller 180 may copy the corresponding message and send the message to all of the chat partners who are performing the group chatting. The message is displayed on the region 1801 out of the blind region.

Figure 18C:
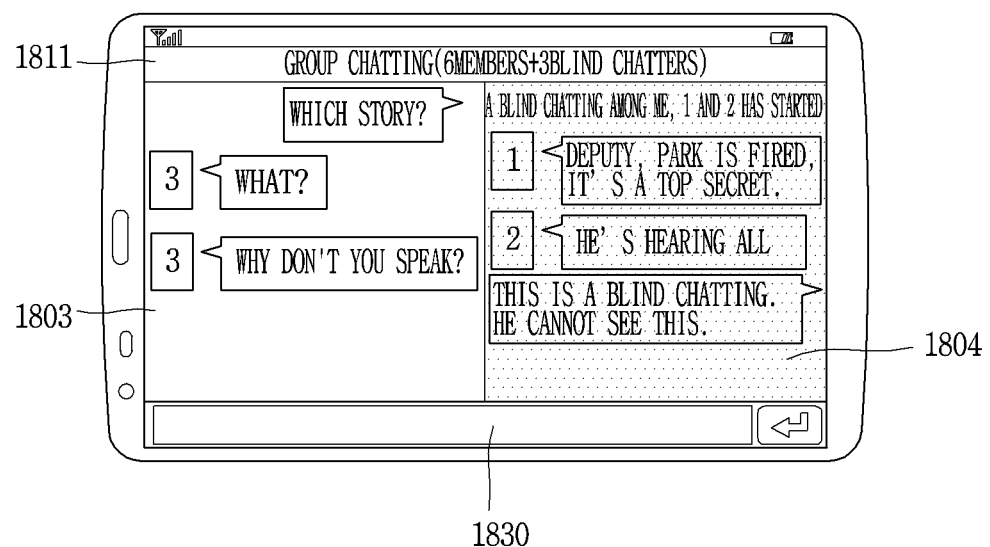

Referring to FIG. 18C, as a screen mode of the mobile terminal is converted into a 'horizontal viewing mode' from a 'vertical viewing mode' during a blind chatting, chats among chat partners who are performing a group chatting are displayed on a left region 1803 of the display unit 151, whereas chats corresponding to the blind chatting are displayed on a right region 1804 of the display unit 151. In this case, if a user touches the left region before inputting a message to be sent to a message writing region 1830, the message is sent to all of the chat partners who are performing the group chatting. On the other hand, if the user touches the right region, the message is sent to only blind chatters.

As aforementioned, in an embodiment of the present invention, a user may perform a blind chatting with a specific person by using a controller UI, during a group chatting. And chats corresponding to the blind chatting are displayed on a current chat screen in a differentiated manner, which is advantageous to the user.

FIGS. 19A to 19D are exemplary conceptual views for explaining a method of differently processing message views related to a specific person, in the mobile terminal according to an embodiment of the present invention.

Figure 19A:
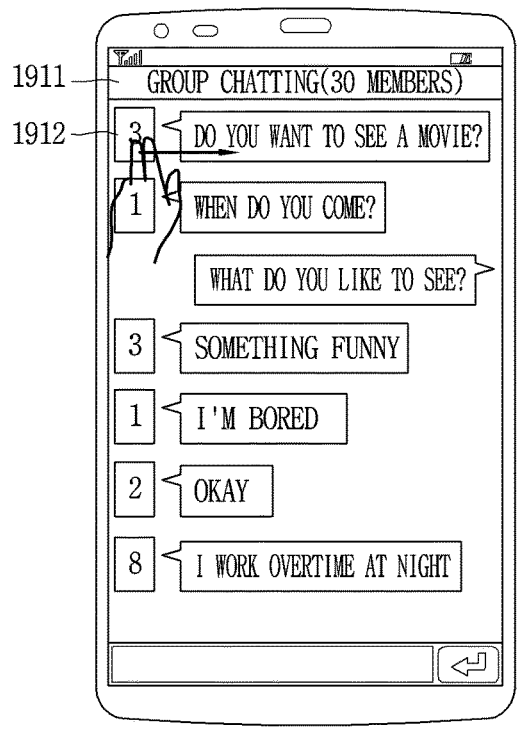
FIGS. 19A to 19D are exemplary conceptual views for explaining a method of differently processing message views related to a specific person, in a mobile terminal according to an embodiment of the present invention.
Figure 19B:
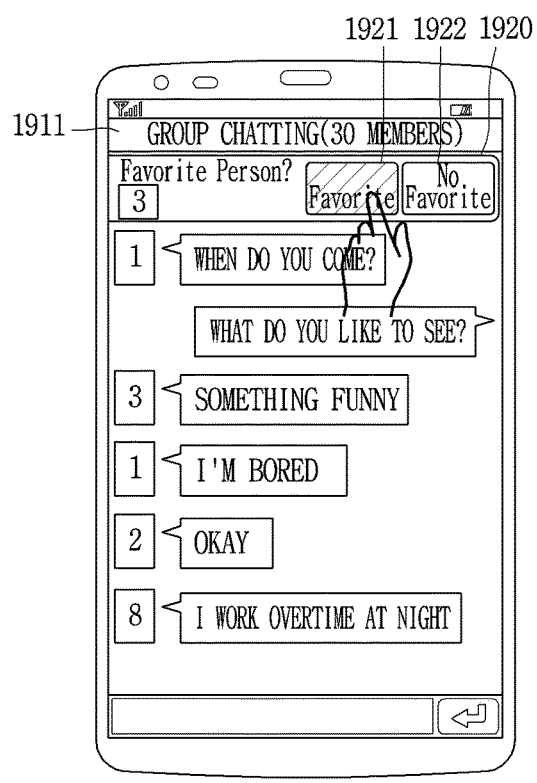

In case of viewing only chats with a specific person on a group chatting screen including a plurality of persons, as shown in FIG. 19A, if a two-finger touch input applied to a region 1912 which displays information on a desired specific person is dragged to the right or left by more than a predetermined range, the controller 180 may enter a selection mode. As a result, the controller 180 may output a user interface 1920 in a direction horizontal to the corresponding region 1912, as shown in FIG. 19B. The user interface 1920 may include a 'Favorite' item 1921 and a 'No Favorite' item 1922.

If the 'Favorite' item is selected, the controller 180 may display messages received from a corresponding chat partner in a differentiated manner from those received from other chat partners. For instance, although not shown, on the group chatting screen, messages received from '3' set as the 'Favorite' may be provided with a color, a shape, or a highlighting effect which is visually differentiated from that of other messages.

Figure 19C:
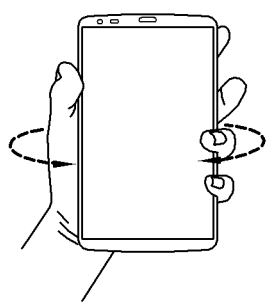
Figure 19D:
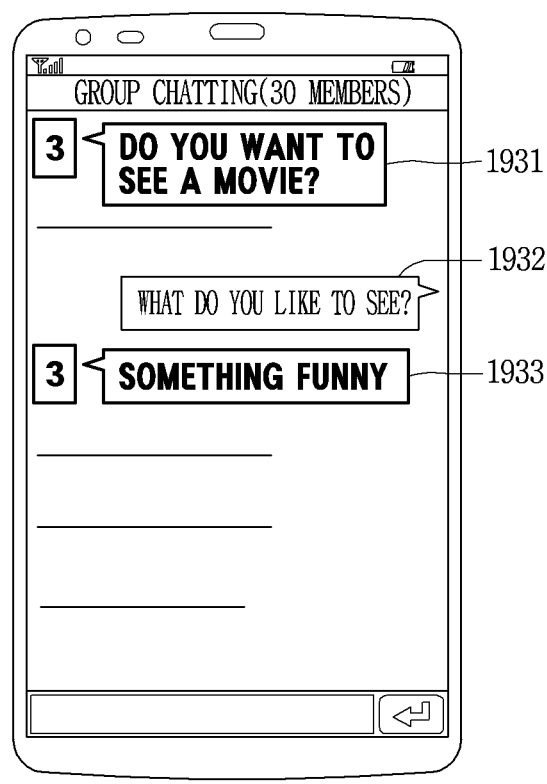

As shown in FIG. 19C, if a gesture to move the mobile terminal right and left and up and down is received, the controller 180 may display other messages, except for messages 1931, 1933 received from '3' set as the 'Favorite' and a message 1932 written by the user, in a small size, or may omit the display. With such a configuration, a user may check only messages transceived with a specific person on a group chatting screen, in a sorted manner, which is advantageous to the user.

Figure 20A:
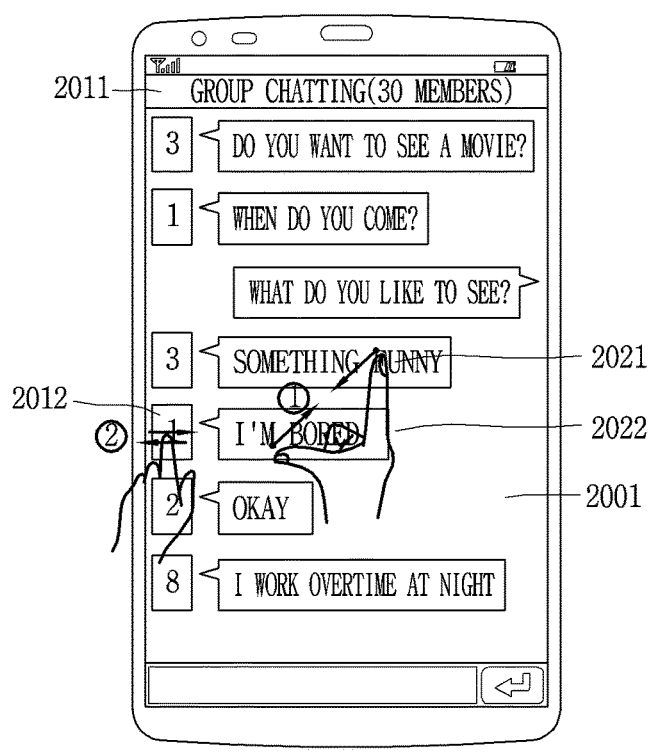
FIGS. 20A and 20B are exemplary conceptual views for explaining a method of scraping (clipping) related messages by using a touch input, in a mobile terminal according to an embodiment of the present invention.
Figure 20B:
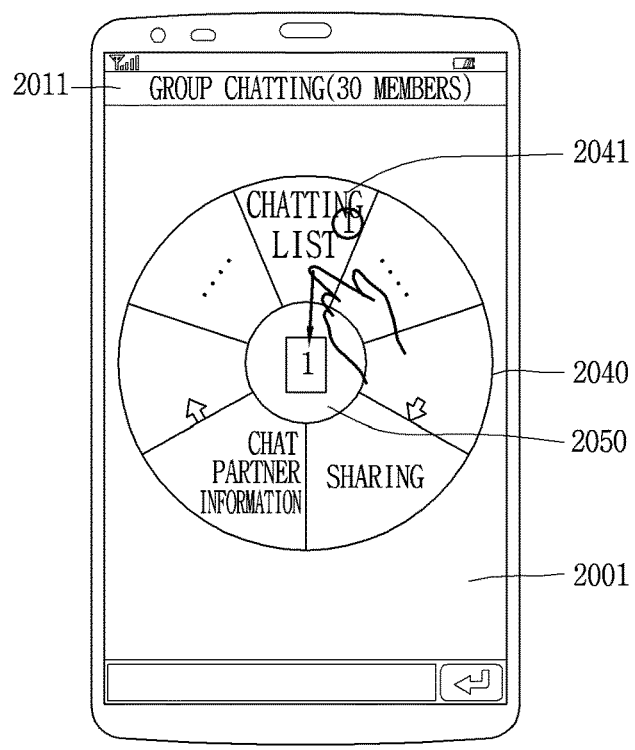

FIGS. 20A and 20B are exemplary conceptual views for explaining a method of scraping a plurality of related messages to a controller UI, by using a touch input, in the mobile terminal according to an embodiment of the present invention.

In an output state of a chat screen, a drag input may be applied to a message display region toward a chat partner information display region, and then a touch input to rub the chat partner information display region right and left/up and down may be consecutively performed. Alternatively, contrary to this, a touch input to rub the chat partner information display region right and left/up and down may be firstly performed, and then a drag input may be applied to the chat partner information display region toward the message display region. In this case, the controller 180 may generate scrap information associated with the corresponding chat partner information, based on the corresponding message.

The scrap information may be set through at least one keyword extracted from the corresponding message, a preset category corresponding to the message, or a user input. The generated scrap information may be stored together with the corresponding message, and time information and situation information on the message. And a user may check the generated scrap information by using a controller UI popped-up as a touch input to rub the chat partner information display region right and left/up and down is performed on the chat screen.

In case of generating scrap information associated with a specific person based on a plurality of messages not a single message or based on messages included within a predetermined range, a plurality of messages may be connected to each other, by applying a pinch-out touch input to at least one message 2021 and another message 2022 output to a chat screen 2001, as shown in FIG. 20A.

In this case, the controller 180 may extend a range of the messages connected to each other in proportion to the number of times of the pinch-output touch input. Although not shown, may be displayed a start message and an end message within the range of the messages connected to each other by the pinch-out touch input.

Then, if a touch input to rub a region 2012 which displays information on a desired chat partner right and left is applied within a reference time, the controller 180 stores the plurality of messages connected to each other, in association with the chat partner (e.g., '1') corresponding to the region 2012. As a result, a 'chat list 1' 2041 is displayed on a menu region 2040 of the controller UI output to the display unit 151, as scrap information related to the chat partner (e.g., '1') corresponding to the region 2012. If the 'chat list 1' 2041 is selected, a start message and an end message corresponding to the selected 'chat list 1' are displayed on an input region 2050.

So far, have been explained various examples to display messages in association with a specific person, by using a touch input to rub right and left a chat partner information display region (e.g., a corresponding region) on a chat screen.

Hereinafter, a method of extending a touch input to rub a specific region right and left to a message display region, and a chat screen region which displays neither messages nor chat partner information, will be explained in more detail.

Figure 21A:
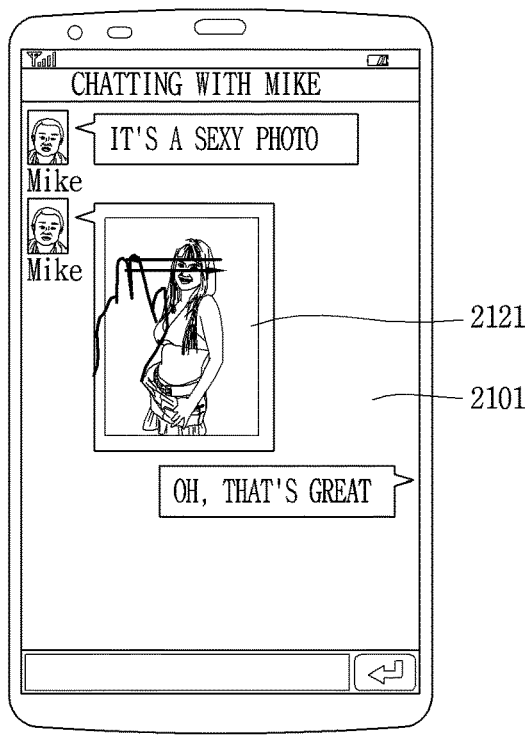
FIGS. 21A to 21C are exemplary conceptual views for explaining a method of changing a specific message by using a touch input, in a mobile terminal according to an embodiment of the present invention.
Figure 21B:
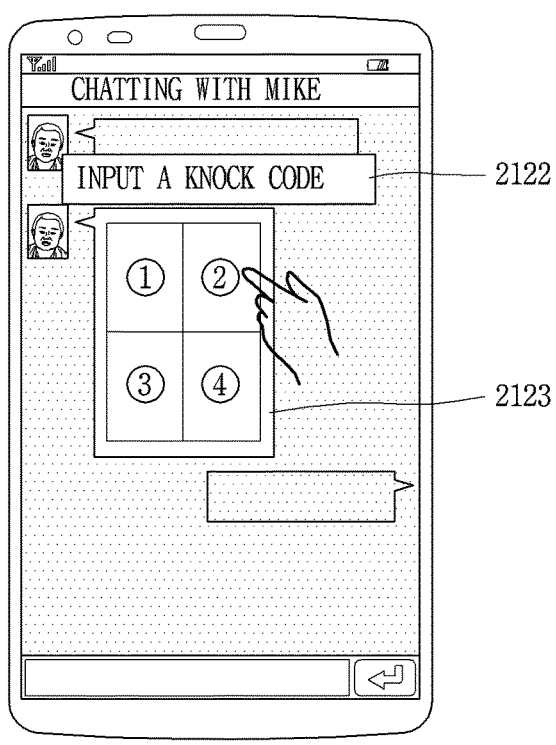
Figure 21C:
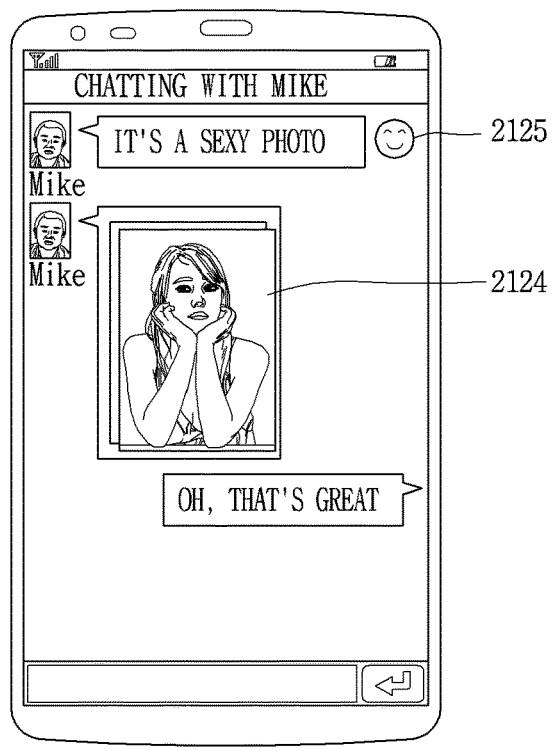

FIGS. 21A to 21C show a method of changing a specific message by using a touch input to rub a message display region right and left, in the mobile terminal according to an embodiment of the present invention.

Referring to FIG. 21A, in case of hiding a message sent from a chat partner on a chat screen 2101, if a touch input to rub the sent message (e.g., a specific image 2121) right and left is received, the controller 180 may display screen information for setting a password to the specific image 2121. As a result, as shown in FIG. 21B, a message 2122 for guiding a password setting, and an input region 2123 for setting a password by inputting a touch input of a specific pattern, are overlapped on the specific image 2121.

If a plurality of touch inputs (e.g., ②③④①) of a specific pattern are received on the input region 2123 according to the message 2122, a password is set to the specific image 2121, and the specific image 2121 is converted into a substitute image 2124. Here, an icon 2125 indicating that there is a message set with a password may be displayed on one region of the chat screen. If a user inputs the password to the substitution image 2124 (e.g., if touch inputs are sequentially applied to regions corresponding to ②③④①), the substitution image 2124 is converted into the original specific image 2121 for a predetermined time.

FIGS. 22A to 22F and 23A to 23C show a method of indexing a specific message or information by using a touch input to rub right and left a chat screen which is out of a message region and a chat partner information display region, in the mobile terminal according to an embodiment of the present invention.

Figure 22A:
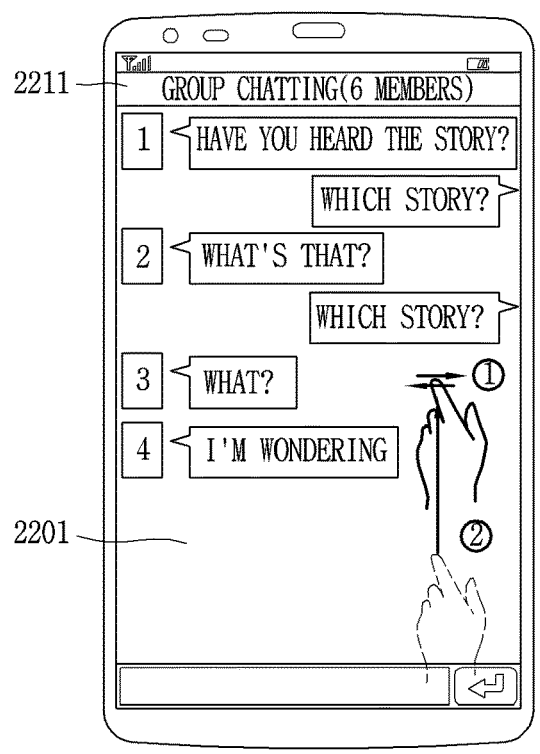
FIGS. 22A to 22F and 23A to 23C are exemplary conceptual views for explaining a method of indexing a specific message or information by using a touch input, in a mobile terminal according to an embodiment of the present invention.

As shown in FIG. 22A, a touch input is applied to rub right and left a region which is out of a message region and a chat partner information display region on a chat screen, and then a flicking touch input for scrolling is applied. As a result, the controller 180 may display index information indicating an output position of a specific type of message on a scroll bar region 2260. For instance, the controller 180 may distinguish messages transceived with a chat partner according to a plurality of categories, e.g., a phone number, a general chat, an address, a photo, and a link. Then, the controller 180 may display information of the same category on the scroll bar region 2260 in the same color or shape.

Figure 22B:
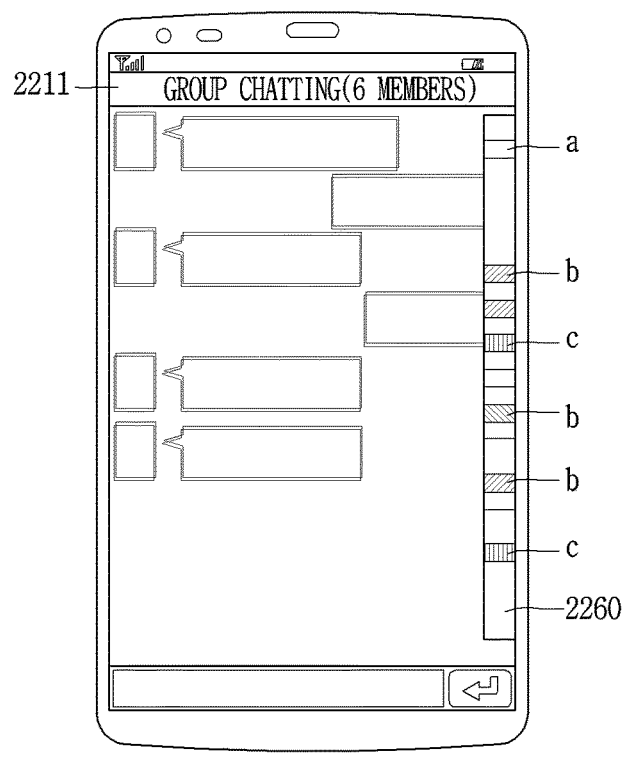
Figure 22C:
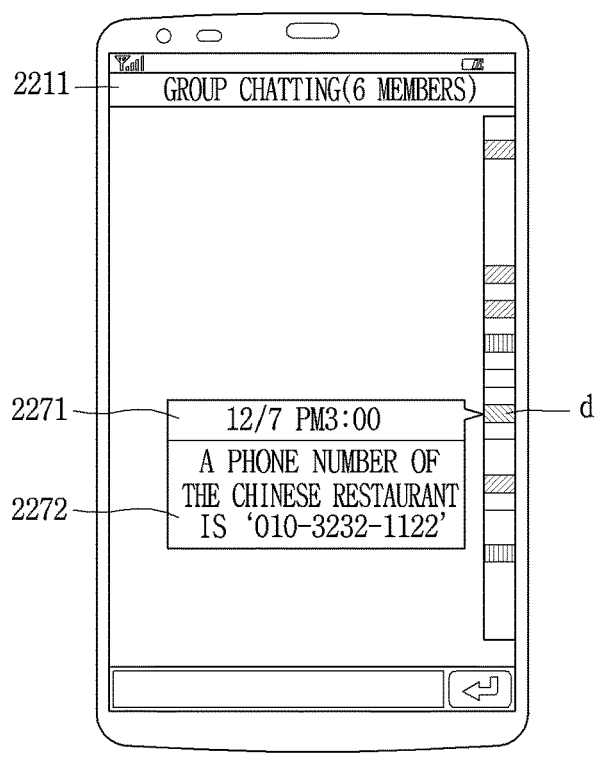

For instance, referring to FIG. 22B, a white color indicating a general chat, a red color (a) indicating a phone number, a yellow color (b) indicating link information, and a blue color (c) indicating a photo may be displayed on the scroll bar region 2260, in a classified manner. As a scrolling operation is performed, the controller 180 may control time information (e.g., '12/7 PM 3:00') and headline information (e.g., A phone number of the Chinese restaurant is xxx'.) on a message corresponding to a specific position (d), to be popped-up and then to disappear, at constant time intervals and at a predetermine section.

Figure 22D:
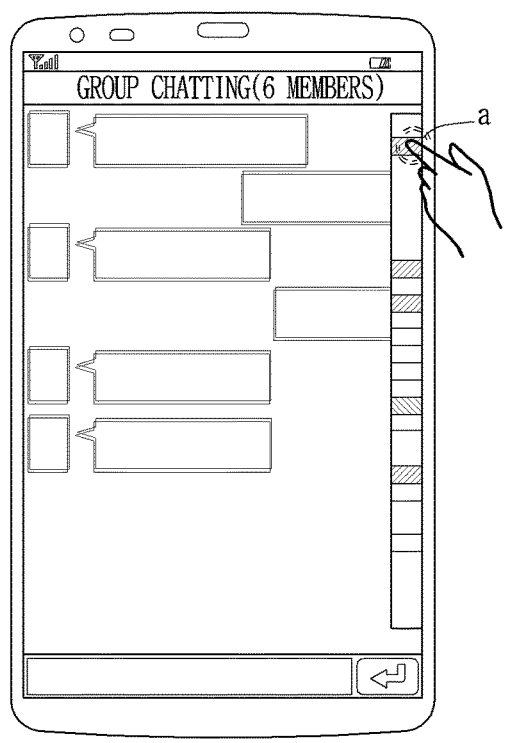
Figure 22E:
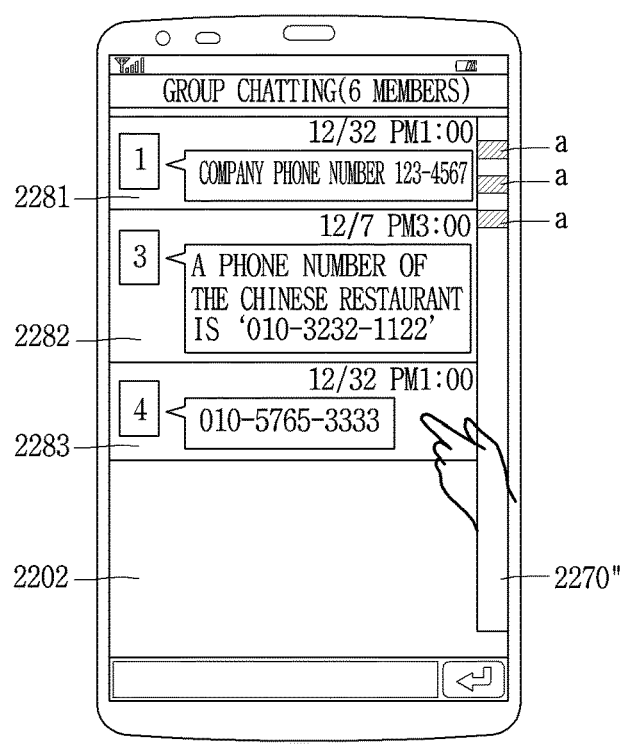
Figure 22F:
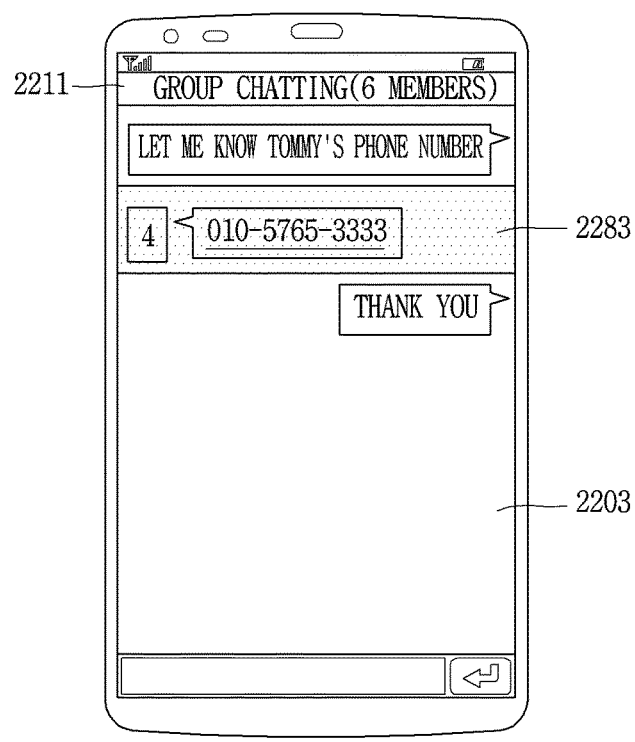

As shown in FIG. 22D, if a preset touch input (e.g., a long touch input) is applied to a specific category display region (a) on the scroll bar region 2260, only messages 2281, 2282, 2283 which belong to a category corresponding to the region may be output to the display unit 151 on the chat screen, in a sorted manner, as shown in FIG. 22E.

Here, if a specific message 2283 is selected, the controller 180 moves to the output position of the message 2283, and controls a more detailed chat screen 2203 to be displayed on the display unit 151.

Figure 23A:
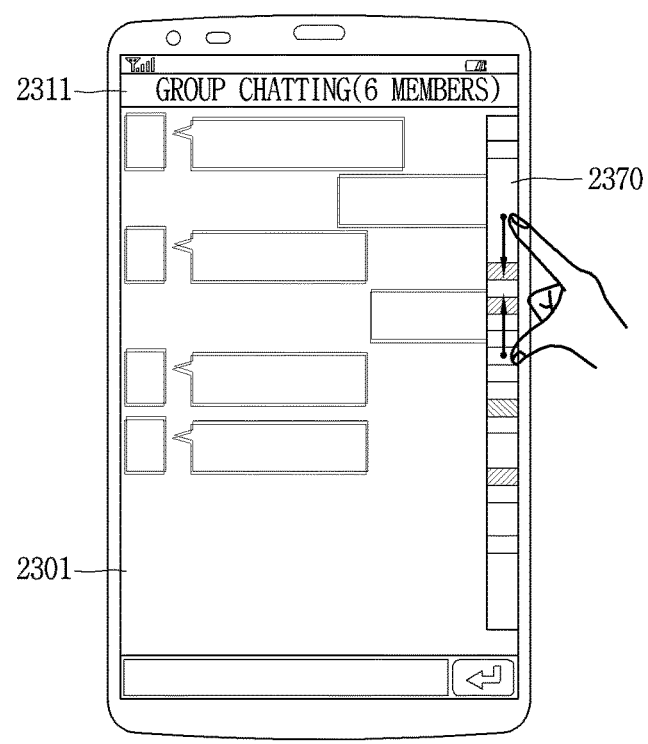
Figure 23B:
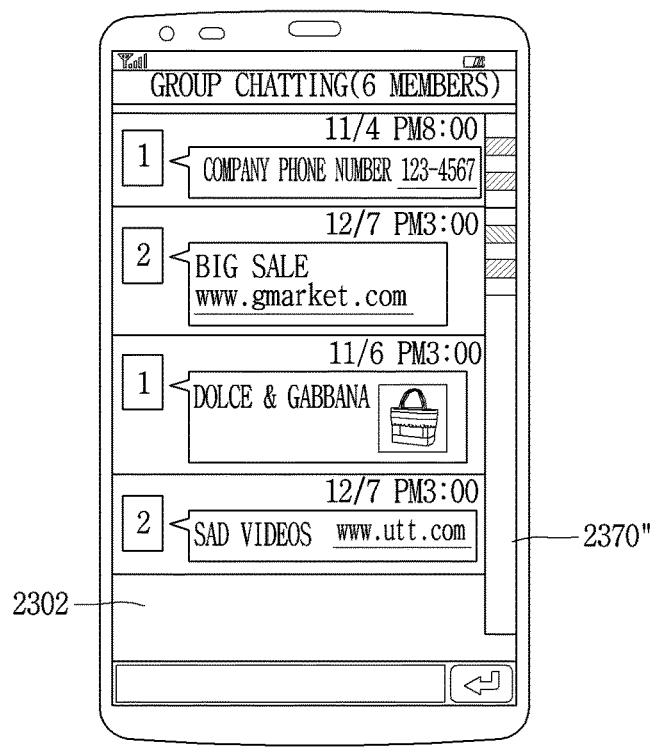
Figure 23C:
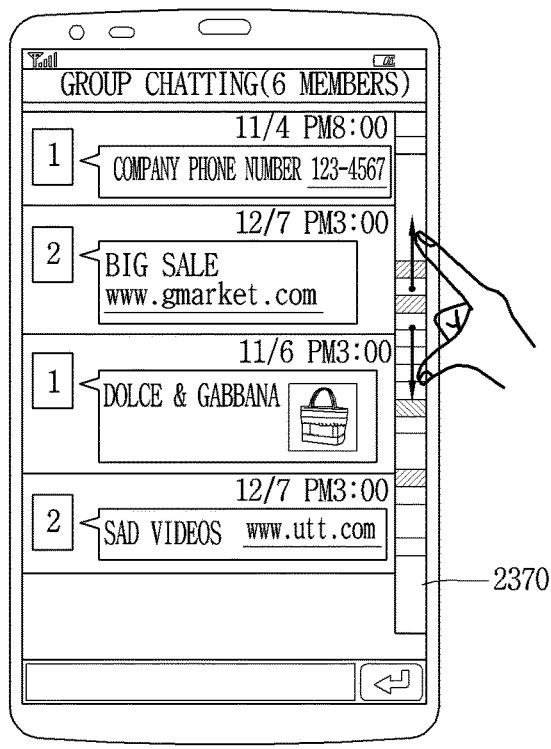

As shown in FIG. 23A, if a pinch-in touch input is applied to a scroll bar region 2370, only messages which belong to categories displayed on the scroll bar region 2370 are output to the display unit 151 in a sorted manner. As a result, as shown in FIG. 23B, phone number-included messages, link information-included messages, image-included messages, etc. are displayed (2302) in a reception order, and the categories are displayed on the scroll bar region 2370 in a connected manner (2370"). In this state, if a pinch-out touch input is applied to the scroll bar region 2370, the categories connected to each other are displayed in the original state (in a widened manner), and the scrolling operation is continuously performed or broken.

Although not shown, a touch input may be applied to rub right and left one point on the chat screen 2201, the point out of a message region and a chat partner information display region. Then, a two-finger based flicking touch input for scrolling may be performed. In this case, the controller may jump to a specific category region. Further, if a drag input is applied to drag the specific category region on a scroll bar region to a region out of the scroll bar region, specific information corresponding to the category (e.g., phone numbers, photos, etc.) may be generated as scrap information associated with corresponding chat partner information, or may be stored in a bookmarked manner.

As aforementioned, in the mobile terminal and the method for controlling the same according to an embodiment of the present invention, among messages transceived with a specific person or a plurality of persons, messages desired to be associated with a specific person may be immediately stored or checked to be used, based on a touch input. With such a configuration, a user may immediately store a desired message or information in association with a specific person while chatting, or may check the stored message while chatting or may immediately write a message using the stored message. This may enhance a user convenience. Further, a user may perform a blind chatting with a specific person by using a controller UI during a group chatting, or may check only messages sent from a specific person. Also, it is possible to change a content of a displayed message by using a touch input. Further, indexing information is provided to a scroll bar region such that a specific message or information among a plurality of messages transceived with a chat partner is easily searched. This may allow a user to more easily search for desired information on a chat screen.

It is understood by those skilled in the art that the present features can be embodied in several forms without departing from the characteristics thereof. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A mobile terminal, comprising:
    a display unit configured to output a first region which displays messages and a second region which displays chat partner information corresponding to the messages; and
    a controller configured to output, to the display unit, a controller user interface (UI) for processing a message to be displayed on the first region in association with a chat partner corresponding to the second region when a preset touch input is received on the second region,
    wherein the controller UI comprises:
        a menu region which displays scrap information associated with the chat partner corresponding to the second region among the messages displayed on the first region, wherein the scrap information is at least one of a keyword, a category, and an image which represents a stored message with the chat partner; and an input region which displays a message or chat partner information corresponding to the scrap information selected from the menu region, wherein on the controller UI, the input region is formed as an inner circle, and the menu region is formed as an outer circle which encloses an edge of the input region and which is rotatable in at least one direction, and wherein if a touch input to rotate the menu region in one direction is applied to the menu region, the menu region is rotated along the touch input in a fixed state of the input region, and the scrap information is changed in correspondence to the rotation.

2. The mobile terminal of claim 1, wherein the preset touch input is a touch input to touch and drag an image icon indicating the chat partner in the second region right and left or up and down, and the controller UI is popped-up when the touch input is released.

3. The mobile terminal of claim 1, wherein in a popped-up state of the controller UI, if a touch input applied to the scrap information is dragged to the input region, a message corresponding to the scrap information is displayed on the input region.

4. The mobile terminal of claim 3, wherein if there are a plurality of messages corresponding to the scrap information, number information indicating a number of messages is displayed next to the scrap information, and if a touch input applied to the scrap information is dragged to the input region, a next message corresponding to the scrap information is displayed on the input region.

5. The mobile terminal of claim 1, wherein the first and second regions are converted into a deactivated state while the controller UI is being output, and if a touch input is applied to a region outside the controller UI, the controller UI disappears and the first and second regions are converted into an activated state.

6. The mobile terminal of claim 1, wherein if the scrap information selected from the menu region is dragged to the input region, the controller displays a message or chat partner information corresponding to the selected scrap information on the input region.

7. The mobile terminal of claim 6, wherein if a first touch input is applied to the input region in a displayed state of at least one message on the input region, the controller controls the at least one message to be output to a message writing region.

8. The mobile terminal of claim 7, wherein if a second touch input is applied to the input region in the displayed state of at least one message on the input region, the controller UI disappears, and a chat screen corresponding to an output position of the at least one message is output to the display unit.

9. The mobile terminal of claim 6, wherein if a sharing function item displayed on the menu region is selected in a displayed state of at least one message on the input region, the scrap information displayed on the menu region is converted into information on a chat partner to which the at least one message is to be sent.

10. The mobile terminal of claim 1, wherein if the controller UI is output, the chat partner information displayed on the second region is displayed on the input region, and wherein if a touch input is applied to the input region before the scrap information is selected, the controller replaces the scrap information to be displayed on the menu region by another item related to the chat partner information displayed on the input region.

11. The mobile terminal of claim 1, wherein if a chat partner viewing item is selected from the menu region, the controller converts the scrap information displayed on the menu region into icons corresponding to the chat partner information.

12. The mobile terminal of claim 11, wherein if a touch line of a first shape is drawn on one of the icons and a drag input toward the input region is received, the controller controls only messages received from a chat partner corresponding to the one icon, to be output the display unit.

13. The mobile terminal of claim 12, wherein if a touch line of a second shape is drawn on one of the icons and a drag input toward the input region is received, the controller controls a written message to be sent to only a chat partner corresponding to the one icon.

14. The mobile terminal of claim 11, wherein if a drag input toward the input region is applied to one of the icons and a touch input is applied to the input region, the controller controls a blind chatting to be performed with a chat partner corresponding to the one icon, on a current chat screen.

15. The mobile terminal of claim 14, wherein if messages corresponding to the blind chatting are displayed on blind regions visually differentiated from other messages, and the other messages are displayed among the plurality of blind regions.

16. The mobile terminal of claim 1, wherein if a drag input is applied from one of the first and second regions toward another thereof, the controller generates scrap information by correlating a message displayed on the first region with chat partner information displayed on the second region.

17. The mobile terminal of claim 16, wherein the scrap information is generated based on at least one keyword extracted from the message displayed on the first region, and wherein if a preset touch input is received on the second region, the controller controls the generated scrap information to be displayed on the menu region.

18. The mobile terminal of claim 1, wherein a mark visually differentiated from another message is output to a message corresponding to the scrap information, and wherein if a touch line of a preset shape is input to the scrap information displayed on the menu region, the mark on the message corresponding to the scrap information is released.

19. The mobile terminal of claim 1, wherein when the preset touch input is received on the second region, the controller displays first screen information for setting a password to a message displayed on the second region, and wherein when a password is input by using the first screen information, the controller converts the message displayed on the second region into a substitution image.

20. A method for controlling a mobile terminal including a display unit, the method comprising:

displaying messages on a first region of the display unit, and displaying chat partner information corresponding to the messages on a second region of the display unit; and if a preset touch input is received on the second region, outputting a controller user interface (UI) for processing a message to be displayed on the first region in association with a chat partner corresponding to the second region;

selecting scrap information associated with the chat partner corresponding to the second region, by using the controller UI, wherein the scrap information is at least one of a keyword, a category, and an image which represents a stored message with the chat partner and displayed on a menu region in the controller UI; and displaying a message corresponding to the selected scrap information on the controller UI, wherein on the controller UI, an input region is formed as an inner circle, and the menu region is formed as an outer circle which encloses an edge of the input region and which is rotatable in at least one direction, and wherein if a touch input to rotate the menu region in one direction is applied to the menu region, the menu region is rotated along the touch input in a fixed state of the input region, and the scrap information is changed in correspondence to the rotation.

* * * * *